US012713998B2

(12) United States Patent
Nishii et al.

(10) Patent No.: US 12,713,998 B2
(45) Date of Patent: Aug. 25, 2026

(54) WORK SUPPORT METHOD, WORK SUPPORT SYSTEM, AND PROGRAM

(71) Applicant: Yanmar Holdings Co., Ltd., Osaka (JP)

(72) Inventors: Yasuto Nishii, Okayama (JP); Masaaki Murayama, Okayama (JP); Yuji Yamaguchi, Okayama (JP)

(73) Assignee: YANMAR HOLDINGS CO., LTD., Osaka (JP)

(*) Notice: Subject to any disclaimer, the term of this patent is extended or adjusted under 35 U.S.C. 154(b) by 371 days.

(21) Appl. No.: 18/206,973

(22) Filed: Jun. 7, 2023

(65) Prior Publication Data

US 2023/0397519 A1 Dec. 14, 2023

(30) Foreign Application Priority Data

Jun. 8, 2022 (JP) ................................ 2022-093036
Jun. 8, 2022 (JP) ................................ 2022-093041
Jun. 8, 2022 (JP) ................................ 2022-093044

(51) Int. Cl.
*A01B 76/00* (2006.01)
*A01B 69/04* (2006.01)
(Continued)

(52) U.S. Cl.
CPC ............ *A01B 76/00* (2013.01); *A01B 69/008* (2013.01); *B60Q 5/005* (2013.01); *B60Q 9/00* (2013.01)

(58) Field of Classification Search
CPC ....... A01B 76/00; A01B 69/008; A01B 69/00; B60Q 5/005; B60Q 9/00; B60W 50/14; B60W 2050/143
See application file for complete search history.

(56) References Cited

U.S. PATENT DOCUMENTS

2015/0330802 A1* 11/2015 Ono .................... G05D 1/0061 701/431
2016/0304124 A1* 10/2016 Fujiyoshi .............. B62D 1/286
(Continued)

FOREIGN PATENT DOCUMENTS

CN 104057944 A * 9/2014 ............ B60W 50/08
JP S57169025 U 10/1982
(Continued)

OTHER PUBLICATIONS

Machine Translation of CN-104057944-A (Year: 2014).*
(Continued)

*Primary Examiner* — Sahar Motazedi
(74) *Attorney, Agent, or Firm* — NORTON ROSE FULBRIGHT US LLP

(57) ABSTRACT

A work support method that supports work that uses a work vehicle includes: switching a run mode to an automatic run mode in which the work vehicle is caused to automatically run in a farm field; switching, when a given condition is met in the automatic run mode, the run mode to a manual run mode in which the work vehicle is caused to manually run; and performing a switch notification to notify that the run mode is switched from the automatic run mode to the manual run mode. A mode of the switch notification differs depending on the work vehicle's state at the time of the switching to the manual run mode.

10 Claims, 19 Drawing Sheets

(51) Int. Cl.

| | |
|---|---|
| ***B60G 5/00*** | (2006.01) |
| ***B60Q 5/00*** | (2006.01) |
| ***B60Q 9/00*** | (2006.01) |

(56) References Cited

U.S. PATENT DOCUMENTS

| | | | | |
|---|---|---|---|---|
| 2020/0359547 | A1 | 11/2020 | Sakaguchi et al. | |
| 2021/0197866 | A1 | 7/2021 | Ikenori | |
| 2021/0300403 | A1* | 9/2021 | Kuwabara | B60W 60/0057 |
| 2022/0287218 | A1* | 9/2022 | Yuasa | G05D 1/648 |
| 2023/0133086 | A1* | 5/2023 | Oishi | B60K 35/23 701/23 |
| 2025/0026364 | A1* | 1/2025 | Tambo | A01B 69/00 |

FOREIGN PATENT DOCUMENTS

| | | | | |
|---|---|---|---|---|
| JP | 2014155441 | A | 8/2014 | |
| JP | 2016-168883 | A | 9/2016 | |
| JP | 6450948 | B2 | 1/2019 | |
| JP | 202035141 | A | 3/2020 | |
| JP | 2021108621 | A | 8/2021 | |
| JP | 2021194976 | A | * 12/2021 | |
| JP | 202216479 | A | 1/2022 | |
| KR | 20200042390 | A | * 4/2020 | G08G 1/16 |
| WO | 2019082545 | A1 | 5/2019 | |
| WO | 2022071382 | A1 | 4/2022 | |

OTHER PUBLICATIONS

Machine Translation of JP2021194976A (Year: 2021).*

Machine Translation of KR20200042390A (Year: 2020).*

Extended European Search Report dated Nov. 6, 2023 issued in EP Application No. 23172520.1.

Japanese Office Action dated Sep. 30, 2025, issued in JP Application No. 2022-093036.

* cited by examiner

FIG. 26A

| No. | SECTION | MESSAGE CONTENTS |
|---|---|---|
| 1 | PREPARATION FOR AUTOMATIC WORK | DGNSS. |
| 2 | | RTK. |
| 3 | | START INITIALIZING. |
| 4 | | INITIALIZING COMPLETE. |
| 5 | | OPERATE COLOR MONITOR, THEREBY TO CHECK SAFETY BRAKE. |
| 6 | | SELECT FARM FIELD FOR WORK. |
| 7 | FARM FIELD REGISTRATION | PRESS MEASUREMENT START BUTTON. |
| 8 | | PRESS MEASUREMENT COMPLETION BUTTON. |
| 9 | | FARM FIELD MEASUREMENT INTERMITTED. |
| 10 | | WILL RESTART FARM FIELD MEASUREMENT. |
| 11 | | PRESS REGISTRATION BUTTON. |
| 12 | | WORK CONTENT OF TO-BE-REGISTERED FARM FIELD IS XX. ACCEPTABLE? |
| 13 | GENERATE ROUTE START TO END OF AUTOMATIC WORK | REGISTER POINT B. |
| 14 | | AUTOMATIC RUN STARTED. |
| 15 | | AUTOMATIC RUN STOPPED. |
| 16 | | BEING TEMPORARILY STOPPED. |
| 17 | | PAY ATTENTION TO RIDGE. |
| 18 | | RETURNED TO MANUAL. |
| 19 | | ARRIVED AT END POSITION. |
| 20 | | WILL START OUTER WORK |
| 21 | | SENSITIVITY BEING LIMITED. |
| 22 | | ROUTE DEVIATION OF X CM. |
| 23 | | SLIPPED. |
| 24 | | MAKING A LARGE TURN. DECREASE VEHICLE SPEED. |
| 25 | | YAW ANGLE LEARNING COMPLETE. |
| 26 | | UP/DOWN TIMING OF WORK MACHINE LEARNED. |
| 27 | | THE NUMBER OF REMNANT FARM FIELDS IS X. |
| 28 | | WILL RESTART IN A POSITION DIFFERENT FROM RESTART POSITION |

FIG. 26B

| | | |
|---|---|---|
| 29 | SWITCH MODE | USE COLOR MODE TO SET TO ROBOT MODE. |
| 30 | RUN DIRECTION | PRESS REARWARD START. |
| 31 | | WILL MOVE BACK. |
| 32 | START NAVIGATION | WILL MOVE TO WORK START POSITION. |
| 33 | GOAL NAVIGATION | WILL MOVE TO RUN END POSITION. |
| 34 | FAILSAFE | OBSTACLE DETECTED. |
| 35 | | OBSTACLE BEING DETECTED. VEHICLE SPEED BEING LIMITED. |
| 36 | | NO OBSTACLE. RESTART? |
| 37 | | CONNECT EMERGENCY STOP REMOTE CONTROLLER. |
| 38 | | COMMUNICATION STATE OF TABLET NOT GOOD. APPROACH SUBJECT MACHINE. |
| 39 | | CELL OF EMERGENCY STOP REMOTE CONTROLLER WILL RUN OUT. |
| 40 | | CHARGE TABLET. |
| 41 | | WILL SOON BE NEAR DISCHARGE PORT. BE CAREFUL. |
| 42 | | PUT FARM FIELD IN ORDER. |
| 43 | REMOTE OPERATION | RECEIVED TEMPORARY STOP INSTRUCTION FROM REMOTE CONTROLLER. |
| 44 | | RECEIVED EMERGENCY STOP INSTRUCTION FROM REMOTE CONTROLLER. |
| 45 | WORK GUIDANCE | SUPPLY FUEL. |
| 46 | | SUPPLY UREA AQUEOUS SOLUTION. |
| 47 | | PERFORM DPF REPRODUCTION. |
| 48 | | WORK MACHINE NOT DOWN. |
| 49 | | INCREASE SPEED OF DOWNING WORK MACHINE. |
| 50 | | DECREASE VEHICLE SPEED. (OR) UP WORK MACHINE. |
| 51 | | FARM FIELD CHANGED. WILL RESET FARM FIELD ACCUMULATION. |

FIG. 27

| No. | SECTION | MESSAGE CONTENTS |
|---|---|---|
| 1 | FARM FIELD REGISTRATION | CANNOT START MEASUREMENT. TURN ON MOWING CLUTCH. |
| 2 | START NAVIGATION | WILL MOVE TO MOWING START POSITION. |
| 3 | DISCHARGE NAVIGATION | WILL DISCHARGE AFTER XX MINUTES. |
| 4 | | DISCHARGING COMPLETE. |
| 5 | | FULLNESS OF GRAIN STORAGE UNIT IN A CARRIER IS APPROACHING. |
| 6 | | MOVE AUGER DISCHARGE PORT FORWARD (REARWARD). |
| 7 | SWITCH MODE | SWITCH TO AUTOMATIC MODE. |
| 8 | FAILSAFE | VEHICLE SPEED BEING LIMITED. |
| 9 | | MOWING UNIT KEPT DOWN. UP MOWING UNIT. |
| 10 | | CABIN DOOR OPENED. |
| 11 | | STORE AUGER. |
| 12 | | ENGINE UNDER HIGH LOAD. CHECK SETTING OF VEHICLE SPEED AND HANDLING DEPTH. |
| 13 | WORK GUIDANCE | CONVEYING UNIT CLOGGED. |
| 14 | | THRESHING UNIT CLOGGED. |
| 15 | | GRAIN NOT COMPLETELY HARVESTED. |
| 16 | | CURRENT MOWING HEIGHT IS XX. |
| 17 | | HANDLING PORT DEEP. |
| 18 | | HANDLING PORT SHALLOW. |
| 19 | | TANK TANKING XX. |
| 20 | | MOWED STRAW IS XX IN LENGTH. WORK ACCEPTABLE? |
| 21 | | THIS FARM FILED HARVESTED XX KG. |
| 22 | | BREED VARIETY DIFFERENT IN NEXT FARM FIELD. DUE TO THIS, PERFORM DISCHARGE WORK. |

FIG. 28

| No. | SECTION | MESSAGE CONTENTS |
|---|---|---|
| 1 | UP AND DOWN HYDRAULIC PRESSURE, PTO | TURN ON PTO SWITCH. |
| 2 | | TURN OFF PTO SWITCH. |
| 3 | FAILSAFE | CABIN DOOR OPENED. |
| 4 | WORK GUIDANCE | PTO SPEED CHANGE POSITION NOT PROPER. CHECK. |
| 5 | | RUN DRIVE SETTING NOT CONSISTENT WITH SUBJECT MACHINE. |

FIG. 29

| No. | SECTION | MESSAGE CONTENTS |
|---|---|---|
| 1 | START NAVIGATION | WILL MOVE TO PLANTING START POSITION. |
| 2 | STOCKING MATERIAL SUPPLY NAVIGATION | SUPPLY ROUTE DISPLAYED. AFTER RUNNING ON THIS ROUTE, WILL MOVE TO SUPPLY POINT. |
| 3 | | WILL MOVE TO SUPPLY POINT. |
| 4 | | ARRIVED AT NEAR SUPPLY POINT. |
| 5 | SUBSIDIARY SPEED CHANGE | REMOVE FOOT FROM SPEED CHANGE PEDAL. |
| 6 | WORK GUIDANCE | SET TO PLANTING SPEED. |
| 7 | | SEEDLING FOR CONTINUING WORK WILL BE SHORT. SUPPLY SEEDLING. |
| 8 | | FERTILIZER FOR CONTINUING WORK WILL BE SHORT. SUPPLY FERTILIZER. |
| 9 | | SET LEVELING ROTOR TO WORK POSITION. |
| 10 | | FERTILIZER CLOGGED. |
| 11 | | SEEDLING NOT NORMALLY FED. |

WORK SUPPORT METHOD, WORK SUPPORT SYSTEM, AND PROGRAM

CROSS-REFERENCE TO RELATED APPLICATIONS

This application claims priority under 35 U.S.C. § 119 to Japanese Application Nos. 2022-093036 filed Jun. 8, 2022, 2022-093041 filed Jun. 8, 2022 and 2022-093044 filed Jun. 8, 2022 the entire contents of which are hereby incorporated by reference.

TECHNICAL FIELD

The present invention relates to a work support method, a work support system, and a program.

BACKGROUND ART

Conventionally, a work vehicle that automatically runs in a farm field is known (see, for example, Patent Document 1). Because there is a state in which the run operated by an operator is required, the work vehicle is so provided as to be switchable between an automatic run mode and a manual run mode. Patent Document 1 discloses a technology for notifying a driver of the work vehicle or a person in the vicinity of the work vehicle as to whether a run mode of the work vehicle is the automatic run mode or the manual run mode. Further, Patent Document 2 discloses an autonomous run work vehicle that, when changing a proceeding direction or changing a work state, gives a warning notification of the next action by a sound/voice notification measure at a set distance before the starting point of the change.

PRIOR ART DOCUMENT

Patent Document

Patent Document 1: Japanese Unexamined Patent Application Publication No. 2016-168883

Patent Document 2: Japanese Patent No. 6450948

SUMMARY OF INVENTION

Technical Problem

By the way, the state of the work vehicle is not necessarily the same in the case of switching from the automatic run mode to the manual run mode. For example, in the case of switching from the automatic run mode to the manual run mode, the run may be continued or stopped. As the case may be, a difference is caused to the operator's subsequent operational response between when the run is continued and when the run is stopped. Due to this, it is deemed that there is room for further improvement in the guidance after the run mode switching. Further, when shifting from the automatic run mode to the manual run mode, various conditions need to be met for a safety reason and the like. To any person who is not familiar with the operation, this may cause confusion as to which operation to perform, for example. There may also be a state in which the state of the work vehicle's operation system does not match the actual vehicle behavior when the automatic run is automatically stopped for some reason, confusing the operator as to what operation to perform next. Further, in the work vehicle that can be so provided as to be able to automatically run, the content to be guided to the user or the place where the subject person of the guidance is placed may change depending on whether the vehicle is automatically or manually running, for example. Further, each user has a different preference for sound volume, sound quality, or sound type. This may cause the user to feel stressed about the sound/voice guidance when the preset sound setting is contrary to the user preference.

In view of the above, it is an object of the present invention to provide a technology that can perform proper guidance after the run mode switching in a work vehicle, a technology that can perform proper guidance which is in response to the run mode switching in the work vehicle, and a technology that can perform proper guidance in the work vehicle that is so provided as to be able to automatically run.

Solution to Problem

An exemplary work support method of the exemplary present invention is a work support method that supports work that uses a work vehicle, wherein the method performs: switching a run mode to an automatic run mode in which the work vehicle is caused to automatically run in a farm field; switching, when a given condition is met in the automatic run mode, the run mode to a manual run mode in which the work vehicle is caused to manually run; and performing a switch notification to notify that the run mode is switched from the automatic run mode to the manual run mode. A mode of the switch notification differs depending on the work vehicle's state at the time of the switching to the manual run mode. Further, a work support method of the exemplary invention is a work support method that supports work that uses a work vehicle, wherein the method performs: switching a run mode from a manual run mode in which the work vehicle is caused to manually run in a farm field to an automatic run mode in which the work vehicle is caused to automatically run; and notifying, when a stop condition for stopping the automatic run mode is met, a given operation required for the switching to the manual run mode. Further, an exemplary work support method of the exemplary present invention is a work support method that supports work that uses a work vehicle so provided as to be able to automatically run in a farm field, wherein the method performs: performing a notification about the work vehicle; and setting a mode of the notification according to a setting by a user or according to a state of the work vehicle.

A work support system of the exemplary present invention is a work support system that supports work that uses a work vehicle, wherein the system includes: a control unit that switches, when a given condition is met in an automatic run mode in which the work vehicle is caused to automatically run in a farm field, a run mode to a manual run mode in which the work vehicle is caused to manually run; and a notification unit that performs a switch notification to notify that the run mode is switched from the automatic run mode to the manual run mode. A mode of the switch notification differs depending on the work vehicle's state at the time of the switching to the manual run mode. Further, a work support system of the exemplary invention is a work support system that supports work that uses a work vehicle, wherein the system includes: a control unit that switches a run mode from a manual run mode in which the work vehicle is caused to manually run in a farm field to an automatic run mode in which the work vehicle is caused to automatically run; and a notification unit that notifies, when a stop condition for stopping the automatic run mode is met, of a given operation required for the switching to the manual run mode. Further, an exemplary work support system of the exemplary present invention is a work support system that supports work that uses a work vehicle so provided as to be able to automatically run in a farm field, wherein the system includes: a notification unit that performs a notification about the work vehicle; and a control unit that sets a mode of the notification according to a setting by a user or according to a state of the work vehicle.

A program of the exemplary present invention is a program that causes a computer to perform a work support method that supports work that uses a work vehicle, wherein the program causes the computer to function as a measure to perform operations including: switching a run mode to an automatic run mode in which the work vehicle is caused to automatically run in a farm field; switching, when a given condition is met in the automatic run mode, the run mode to a manual run mode in which the work vehicle is caused to manually run; and performing a process of a switch notification to notify that the run mode is switched from the automatic run mode to the manual run mode. A mode of the switch notification differs depending on the work vehicle's state at the time of the switching to the manual run mode. Further, a program of the exemplary present invention is a program that causes a computer to perform a work support method that supports work that uses a work vehicle, wherein the program causes the computer to function as a measure to perform operations including: switching a run mode from a manual run mode in which the work vehicle is caused to manually run in a farm field to an automatic run mode in which the work vehicle is caused to automatically run; and notifying, when a stop condition for stopping the automatic run mode is met, a given operation required for the switching to the manual run mode. Further, a program of the exemplary present invention is a program that causes a computer to perform a work support method that supports work that uses a work vehicle so provided as to be able to automatically run in a farm field, wherein the program causes the computer to function as a measure to perform operations including: performing a notification about the work vehicle; and setting a mode of the notification according to a setting by a user or according to a state of the work vehicle.

Advantageous Effects of Invention

The exemplary present invention makes it possible to perform proper guidance after the run mode switching in a work vehicle, to perform proper guidance which is in response to the run mode switching in the work vehicle, and to perform proper guidance in the work vehicle that is so provided as to be able to automatically run.

BRIEF DESCRIPTION OF DRAWINGS

FIG. 26A is a table exemplifying the sound/voice notification commonly applied when the work vehicle provided in the work support system is any of the combine harvester, the tractor, and the rice planter.

FIG. 26B is a table exemplifying the sound/voice notification commonly applied when the work vehicle provided in the work support system is any of the combine harvester, the tractor, and the rice planter.

FIG. 27 is a table exemplifying an example of the sound/voice notification applied when the work vehicle provided in the work support system is the combine harvester.

FIG. 28 is a table exemplifying an example of the sound/voice notification applied when the work vehicle provided in the work support system is the tractor.

FIG. 29 is a table exemplifying an example of the sound/voice notification applied when the work vehicle provided in the work support system is the rice planter.

DESCRIPTION OF EMBODIMENTS

Embodiments of the present invention are to be described with reference to the drawings. Further, in the present specification, directions are defined as below. First, a proceeding direction in which a work vehicle proceeds while working is defined as "front" and a direction opposite to the front is defined as "rear". Further, the right side of the proceeding direction of the work vehicle is defined as right, and the left side is defined as left. Then, a direction perpendicular to the front/rear direction and right/left direction of the work vehicle is defined as an up/down direction. In this case, the gravity direction is defined as down, and the direction opposite to the down direction is defined as up. Note that the directions described above are merely designations used for description, and are not intended to limit the actual positional relation and directions.

1. Outline of Work Support System

Figure 1:
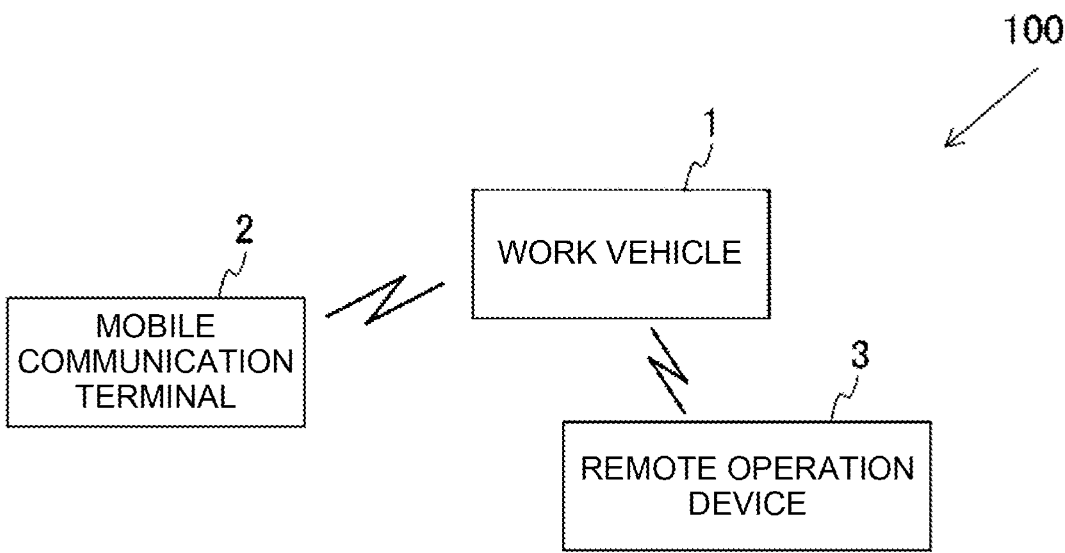
FIG. 1 is a block diagram showing a schematic configuration of a work support system.

FIG. 1 is a block diagram showing a configuration of a work support system 100 according to an embodiment of the present invention. As shown in FIG. 1, the work support system 100 is provided with a work vehicle 1, a mobile communication terminal 2, and a remote operation device 3. The work support system 100 is a system that provides support for work using the work vehicle 1. In detail, the work support system 100 is a system that provides support for work using the work vehicle 1 that is so provided as to automatically run within a farm field. The work support system 100 is, in more detail, a farm field work support system that provides support for farm field work performed using the work vehicle 1 running in the farm field.

Further, the work support system 100 performs a work support method to support the work using the work vehicle 1. The work support system 100 performs the work support method to support the work using the work vehicle 1 that is so provided as to automatically run in the farm field.

[1-1. Work Vehicle]

The work vehicle 1 includes a wide range of the work vehicles that run in the farm field. The work vehicle 1 is, for example, a combine harvester, a tractor, a rice planter, various harvesting machines, or a sprayer that sprays chemicals. The followings are schematic descriptions of configuration examples of a combine harvester 1C, tractor 1T, and rice planter 1R to which the present invention is applied.

Figure 2A:
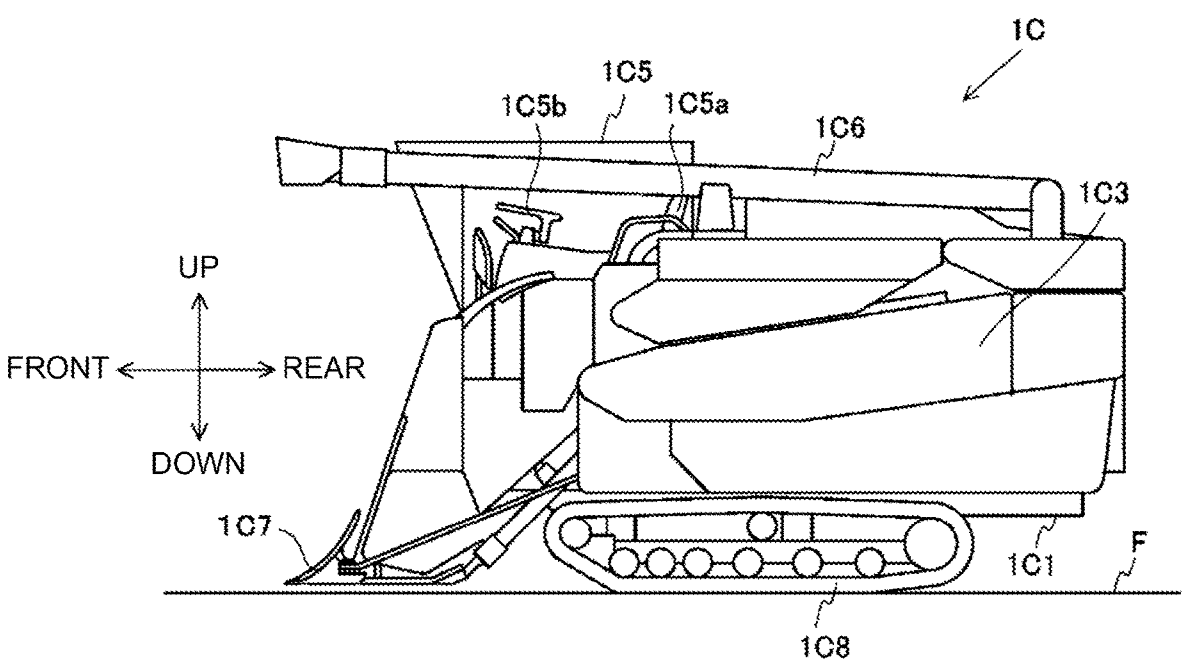
FIG. 2A is a side view of a schematic configuration of a combine harvester.
Figure 2B:
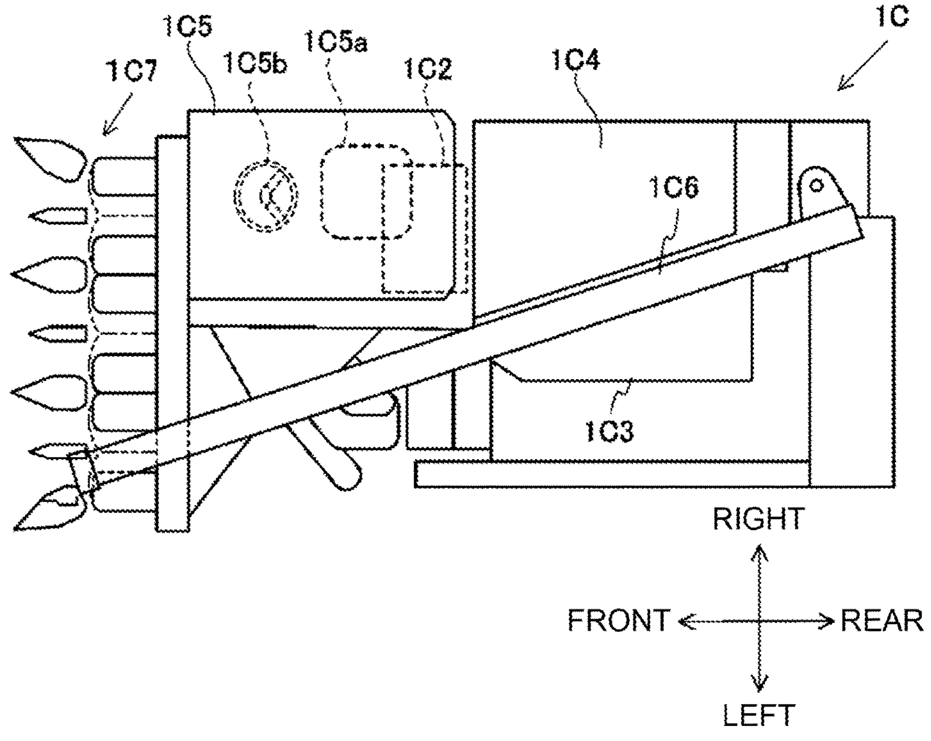
FIG. 2B is a plan view of the schematic configuration of the combine harvester.

FIG. 2A is a side view of a schematic configuration of the combine harvester 1C. In FIG. 2A, a sign F shows the farm field. FIG. 2B is a plan view of the schematic configuration of the combine harvester 1C according to the embodiment of the present invention. As shown in FIGS. 2A and 2B, the combine harvester 1C includes a machine base 1C1, an engine 1C2, a threshing device 1C3, a grain tank 1C4, a drive unit 105, a discharge auger 106, a mowing unit 1C7, and a pair of run units 1C8.

The machine base 1C1 is a frame that supports each unit. The engine 1C2 supplies power to various parts of the combine harvester 1C. The mowing unit 1C7, an example of the work machine, is placed at the front end of the machine base 1C1. The mowing unit 1C7 mows a grain culm growing in the farm field F. An up/down cylinder (not shown) to up and down the mowing unit 1C7 is connected to the mowing unit 1C7. That is, the mowing unit 1C7 is so provided as to be up and down.

The threshing device 1C3 threshes the grain culm mowed by a mowing unit 1C7. The grain tank 1C4 tanks the threshed grain. The discharge auger 106 conveys the threshed grain in the grain tank 1C4 so as to discharge the threshed grain to an outside of the combine harvester 1C. The drive unit 105 is a part where a driver boards. The drive unit 105 includes a drive seat 1C5*a* for the driver to sit on, a steering wheel (handle) 1C5*b* for steering the combine harvester 1C, and various operation units (not shown) for steering the combine harvester 1C. The pairwise run units 1C8 are placed spaced apart in the right/left direction. Each of the pairwise run units 1C8 is so provided as to be able to receive drive power from the engine 1C2. Driven by the run unit 1C8, the combine harvester 1C runs in the farm field F.

Figure 3:
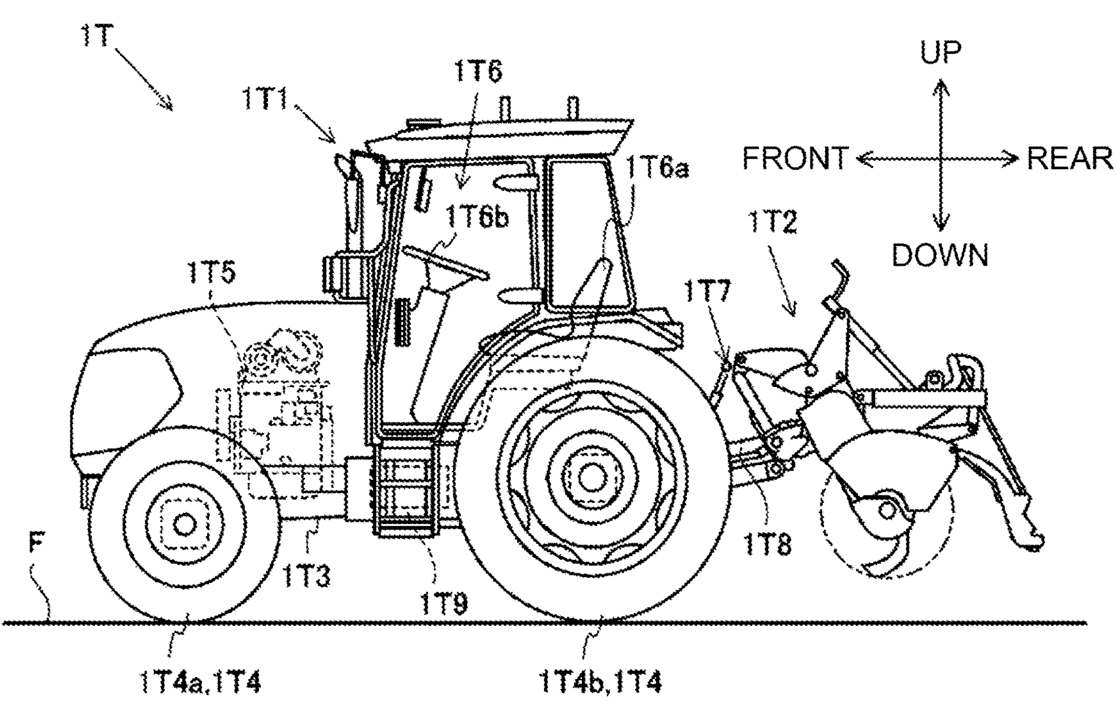
FIG. 3 is a side view of a schematic configuration of a tractor.

FIG. 3 is a side view of a schematic configuration of the tractor 1T according to the embodiment of the present invention. In FIG. 3 as well, the sign F shows the farm field. The tractor 1T is provided with a run machine body 1T1 that runs in the farm field F, and a cultivating machine 1T2 as a work machine mounted on the rear part of the run machine body 1T1. Other than the cultivating machine 1T2, various work machines such as, a plow, a fertilizing machine, a grass cutter, and a seeding machine can be selected.

The run machine body 1T1 has a machine body unit 1T3, and pairwise run units 1T4 that support the machine body unit 1T3 and are placed spaced apart from each other in the right/left direction. Each of the run units 1T4 includes a front wheel 1T4*a* and a rear wheel 1T4*b*. At least one of the front wheel 1T4*a* and the rear wheel 1T4*b* is so provided as to be able to receive the drive power from an engine 1T5 placed in front of the machine body unit 1T3. Driven by the run unit 1T4, the run machine body 1T1 runs in the farm field F. The machine body unit 1T3 is provided with a drive unit 1T6 where the driver boards. The drive unit 1T6 includes a drive seat 1T6*a* for the driver to sit on, a steering wheel 1T6*b* for steering the run machine body 1T1, and an operation unit (not shown) for the driver to perform various operations.

The cultivating machine 1T2 is connected via an up/down link mechanism 1T7 to the rear part of the machine body unit 1T3. In the rear of the machine body unit 1T3, there are placed a PTO shaft (power take-off shaft) 1T8 for outputting the drive force of the engine 1T5 to the cultivating machine 1T2, and a pair of up/down cylinders (not shown) for up/down driving the cultivating machine 1T2. The drive force of the engine 1T5 is transmitted via a transmission 1T9 to the PTO shaft 1T8.

Figure 4:
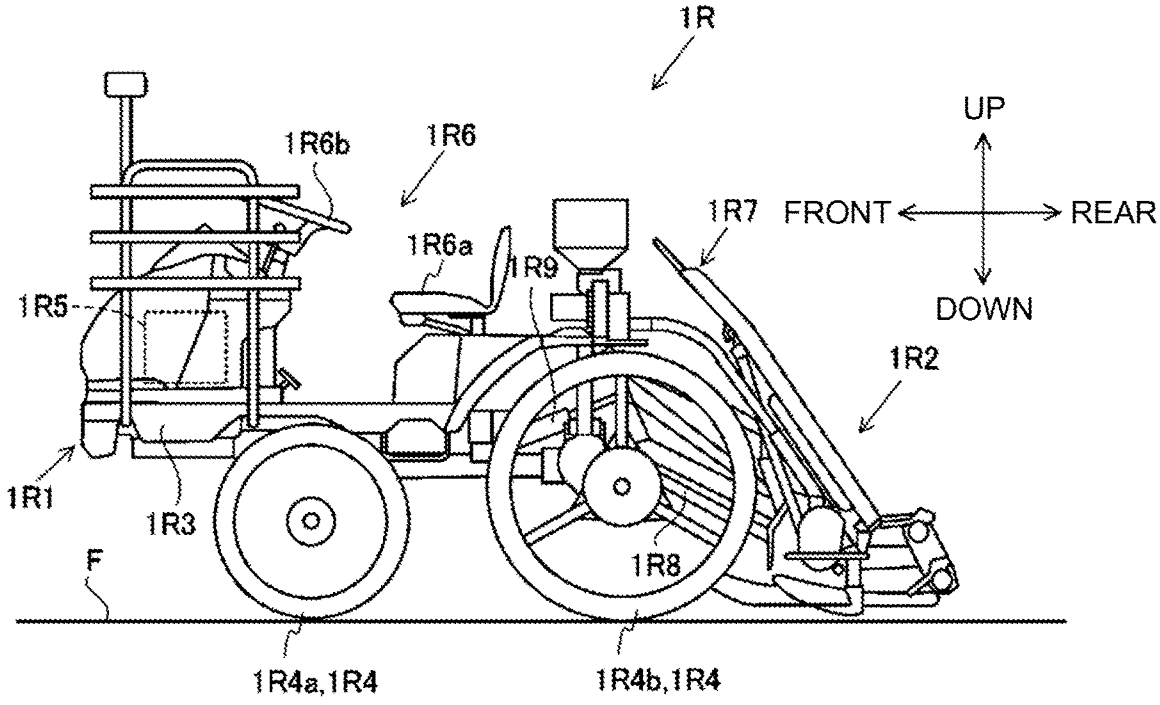
FIG. 4 is a side view of a schematic configuration of a rice planter.

FIG. 4 is a side view of the schematic configuration of the rice planter 1R according to the embodiment of the present invention. The rice planter 1R, while running in the farm field F, performs planting work to plant seedlings on the ground of the farm field F. The rice planter 1R is provided with a run machine body 1R1, and a planting unit 1R2 as a work machine positioned behind the run machine body 1R1.

The run machine body 1R1 has a machine body unit 1R3, and pairwise run units 1R4 that support the machine body unit 1R3 and are spaced apart from each other in the right/left direction. Each of the run units 1R4 includes a front wheel 1R4*a* and a rear wheel 1R4*b*. At least one of the front wheel 1R4*a* and the rear wheel 1R4*b* is so provided as to be able to receive the drive power from the engine 1R5 placed in front of the machine body unit 1R3. Driven by the run unit 1R4, the run machine body 1R1 runs in the farm field F. The machine body unit 1R3 is provided with a drive unit 1R6 for the driver to board. The drive unit 1R6 includes a drive seat 1R6*a* for the driver to sit on, a steering wheel 1R6*b* for steering the run machine body 1R1, and an operation unit (not shown) for the driver to perform various operations.

The planting unit 1R2 is connected via an up/down link mechanism 1R7 to the rear part of the machine body unit 1R3. In the rear of the machine body unit 1R3, there are placed a PTO shaft 1R8 for outputting the drive power of the engine 1R5 to the planting unit 1R2, and an up/down cylinder 1R9 for up/down driving the planting unit 1R2. The drive force of the engine 1R5 is transmitted via a transmission (not shown) to the PTO shaft 1R8.

Figure 5:
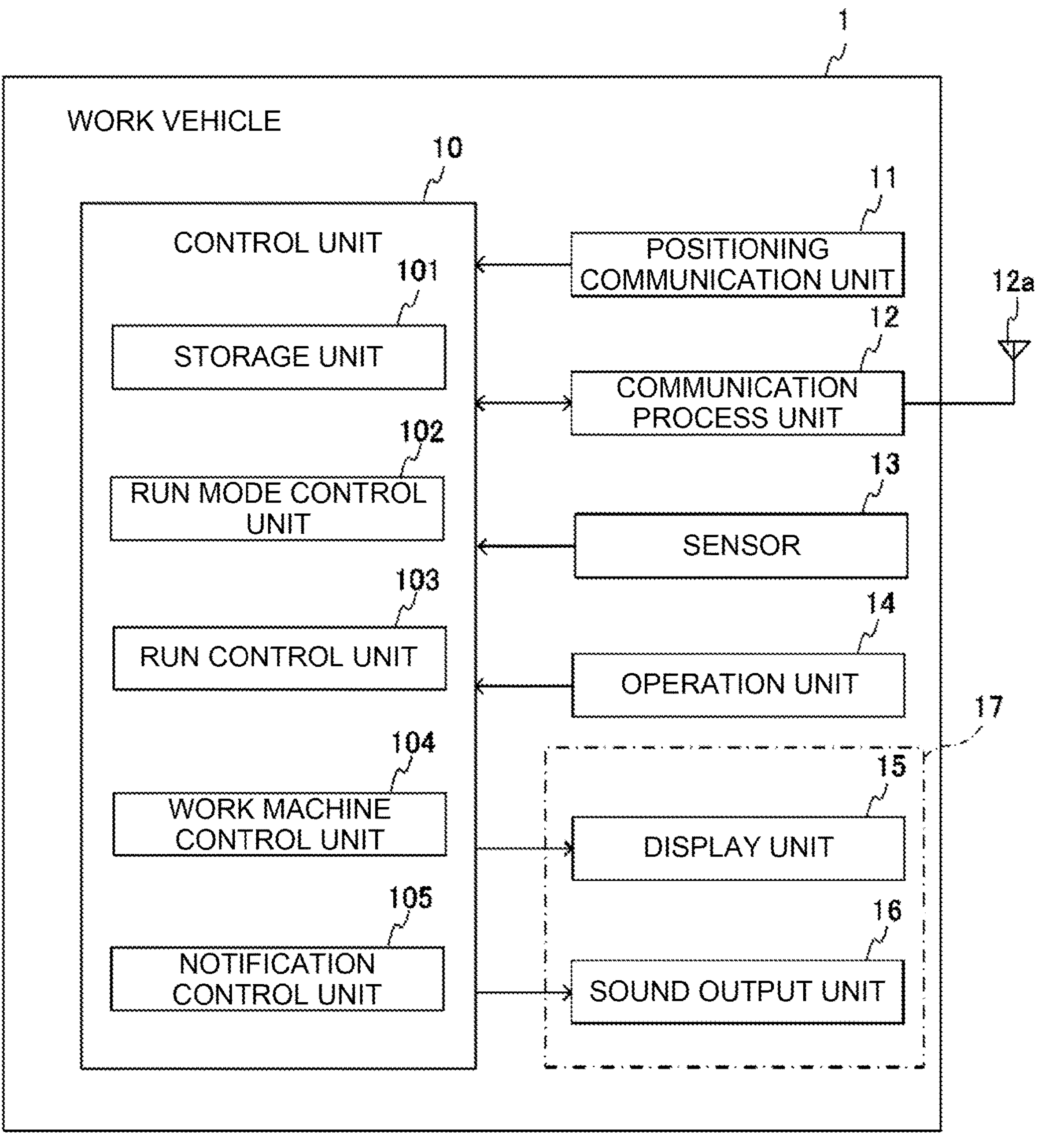
FIG. 5 is a block diagram showing a configuration of a work vehicle.

FIG. 5 is a block diagram showing a configuration of the work vehicle 1 according to the embodiment of the present invention. Further, the configuration shown in FIG. 5 is applicable to the combine harvester 1C shown in FIGS. 2A and 2B, the tractor 1T shown in FIG. 3, and the rice planter 1R shown in FIG. 4.

As shown in FIG. 5, the work vehicle 1 includes a control unit 10. The control unit 10 is a computer configured by including, for example, an arithmetic unit, an input/output unit, and a storage unit 101. The arithmetic unit is, for example, a processor or a microprocessor. The storage unit 101 is a main storage unit such as a ROM (Read Only Memory) and a RAM (Random Access Memory). The storage unit 101 may further include a subsidiary storage unit such as an HDD (Hard Disk Drive) or an SSD (Solid State Drive). The storage unit 101 stores various programs and data. The arithmetic unit reads out the various programs from the storage unit 101, and performs the programs.

In cooperation with the above hardware and software, the control unit 10 can act as a run mode control unit 102, a run control unit 103, a work machine control unit 104, and a notification control unit 105. The control unit 10 may be a single hardware component, or may include a plurality of hardware components communicable with each other.

Further, each of the function units 102 to 105 provided in the control unit may be realized by having the arithmetic unit perform the program, i.e., by the software, as described above, but may also be realized by another method. Each of the function units 102 to 105 may be realized using, for example, an ASIC (Application Specific Integrated Circuit) or an FPGA (Farm field Programmable Gate Array). That is, each of the function units 102 to 105 may be realized by hardware using a dedicated IC or the like. Further, each of the function units 102 to 105 may be realized using a combination of software and hardware. Further, each of the function units 102 to 105 is a conceptual component element. The function performed by one component element may be distributed into multiple component elements. Further, the functions possessed by the multiple component elements may be integrated into a single component element.

A positioning communication unit 11, a communication process unit 12, a sensor 13, an operation unit 14, a display unit 15, and a sound output unit 16 are connected to the control unit 10. That is, the work vehicle 1 is provided with the positioning communication unit 11, the communication process unit 12, the sensor 13, the operation unit 14, the display unit 15, and the sound output unit 16.

The positioning communication unit 11 includes a positioning antenna (not shown), and, using a positioning signal received from a positioning satellite by the positioning antenna, obtains a position of the work vehicle 1 as latitude and longitude information, for example. To the control unit 10, the positioning communication unit 11 outputs the position information of the work vehicle 1. The positioning communication unit 11, on the condition of receiving, in a proper method, the positioning signal from a reference station (not shown), for example, may perform the positioning by using a known RTK-GNSS (Real Time Kinematic GNSS) method. Further, the positioning communication unit 11 may perform the positioning by using a DGNSS (differential GNSS) method, for example.

The communication process unit 12 sends and receives data to and from the mobile communication terminal 2 via a communication antenna 12*a*. Further, the communication antenna 12*a* is an antenna for performing a wireless communication with the mobile communication terminal 2. For the wireless communication, a wireless LAN (Local Area Network) such as Wi-Fi (registered trademark) and a short-range wireless communication such as Bluetooth (registered trademark) may be used. Further, the work vehicle 1 may be provided with a mobile communication antenna for the communication using a mobile telephone line and the Internet. In the above configuration, part of the information stored in the storage unit 101 possessed by the control unit 10 can be stored in an outer server. Further, the above functions of the control unit 10 may be realized in cooperation between the control unit 10 and the server.

The sensor 13 senses information on the work vehicle 1, and outputs the sensed information to the control unit 10. In the present embodiment, the sensor 13 includes multiple types of sensors. Each of the multiple types of sensors is connected to the control unit 10 in a manner to input a signal to the control unit 10. The multiple types of sensors may include, for example, an inertial measurement device, an obstacle sensor, an up/down position sensor, a lever position sensor, and an on/off sensor.

Further, the inertial measurement device includes a 3-axis angular rate sensor and a 3-direction acceleration sensor, and may be capable of measuring the attitude of the work vehicle 1. The obstacle sensor is a sensor that senses an obstacle around the work vehicle 1, and may be, for example, an ultrasonic sensor, a camera, a radar, or LiDAR (Light Detection And Ranging). The up/down position sensor may be a sensor that senses the up/down position of the work machine so provided as to be up and down. For example, the up/down position sensor may be a sensor that senses the up/down position of the mowing unit 1C7 (see FIG. 2A, etc.), the cultivating machine 1T2 (see FIG. 3), or the planting unit 1R2 (see FIG. 4) which are described above. The lever position sensor may be a sensor that senses the position of the operation lever provided in the work vehicle 1. The operation lever may be, for example, a speed change lever. When the work vehicle 1 is provided with multiple operation levers, the lever position sensor may be provided for each of the operation levers. The on/off sensor may be a sensor that senses whether the switch provided in the work vehicle 1 is in the on state or off state. When the work vehicle 1 is provided with multiple switches, the on/off sensor may be provided for each of the switches.

The operation unit 14 includes a wide range of parts that are operated by the driver boarding the drive unit of the work vehicle 1. The operation unit 14 allows the driver to give an instruction to the control unit 10. The operation unit 14 may be, for example, a button, a lever, a dial, a touch screen or the like.

The display unit 15 properly displays information according to the instruction from the control unit 10. The display unit 15 may be, for example, a liquid crystal or an organic EL (electroluminescence) display. The display unit 15 may be configured with a touch screen, in which case the display unit 15 may also serve as the operation unit 14 described above.

The sound output unit 16 properly outputs a sound in response to the instruction from the control unit 10. The sounds may include a voice and a buzzer sound. The sound output unit 16 may be configured to include, in detail, at least one of a speaker and buzzer for sound/voice output.

In the embodiment of the present invention, the display unit 15 and the sound output unit 16 are included in a notification unit 17 which performs the notification by the instruction from the control unit 10. Further, the notification unit 17 may include only any one of the display unit 15 and the sound output unit 16. Further, the notification unit 17 may include a unit other than the display unit 15 and the sound output unit 16. The notification unit 17 may include, for example, a light-emitting measure or a vibration-generating measure.

The run mode control unit 102 controls the switching between the manual run mode and the automatic run mode. The details of the control of the above switching are to be described below. The manual run mode is a mode in which the driver (operator) boards the drive unit of the work vehicle 1 and the driver drives the work vehicle 1. The automatic run mode is a mode that causes the work vehicle 1 to perform the automatic run in the farm field F. Here, the automatic run means that a device for the run is controlled by the control unit 10 provided in the work vehicle 1, and thereby, at least the steering is autonomously performed so that the work vehicle 1 follows a given route. The automatic run may be so configured that in addition to the steering, at least one of a vehicle speed control and the work by the work machine, for example, is autonomously performed.

The automatic run mode may include, for example, at least any one of an automatic straight ahead mode, a manned automatic run mode, and an unmanned automatic run mode. In the automatic straight ahead mode, only the steering operation (operation of steering wheel, and operation of handle) is automatically controlled. In the automatic straight ahead mode, the vehicle speed control, the up/down control of the work machine, and the on/off control of the action of the work machine, for example, are manually performed. In the manned automatic run mode, the work by straight ahead run, and the turn run are automatically performed in a state in which the driver boards the drive unit of the work vehicle 1. In the manned automatic run mode, it is possible to make a switching between the automatic and the manual, for the vehicle speed control and the up/down control of the work machine, for example. In the unmanned automatic run mode (robot mode), all operations are automatically performed with the driver not boarding the drive unit of the work vehicle 1.

The run control unit 103, when the run mode is the automatic run mode, automatically controls at least part of a run system of the work vehicle 1. The run control unit 103, when the automatic run mode is the automatic straight ahead mode, for example, automatically controls the steering operation so that the work vehicle 1 runs along the preset route. The run control unit 103, when the automatic run mode is the manned automatic run mode or the unmanned automatic run mode, for example, automatically controls the steering operation and the vehicle speed adjustment.

The work machine control unit 104 controls the work system of the work vehicle 1 according to the run mode. When the run mode is the manual run mode or the automatic straight ahead mode, the work machine control unit 104 performs the up/down control of the work machine in response to the driver's operation of the operation lever provided at the drive unit of the work vehicle 1, for example. The work machine control unit 104, when the run mode is the manned automatic run mode or the unmanned automatic run mode, automatically performs the up/down control of the work machine, for example.

The notification control unit 105, when a given condition is met, controls the display unit 15 and the sound output unit 16 which are included in the notification unit 17, for example, thereby to cause a notification, which uses a screen display and the sound/voice, to be performed. The given condition is met, for example, when it is necessary to alert the operator as the driver boarding the work vehicle 1 or the operator who is around the work vehicle 1 and operates the work vehicle 1.

[1-2. Mobile Communication Terminal]

Figure 6:
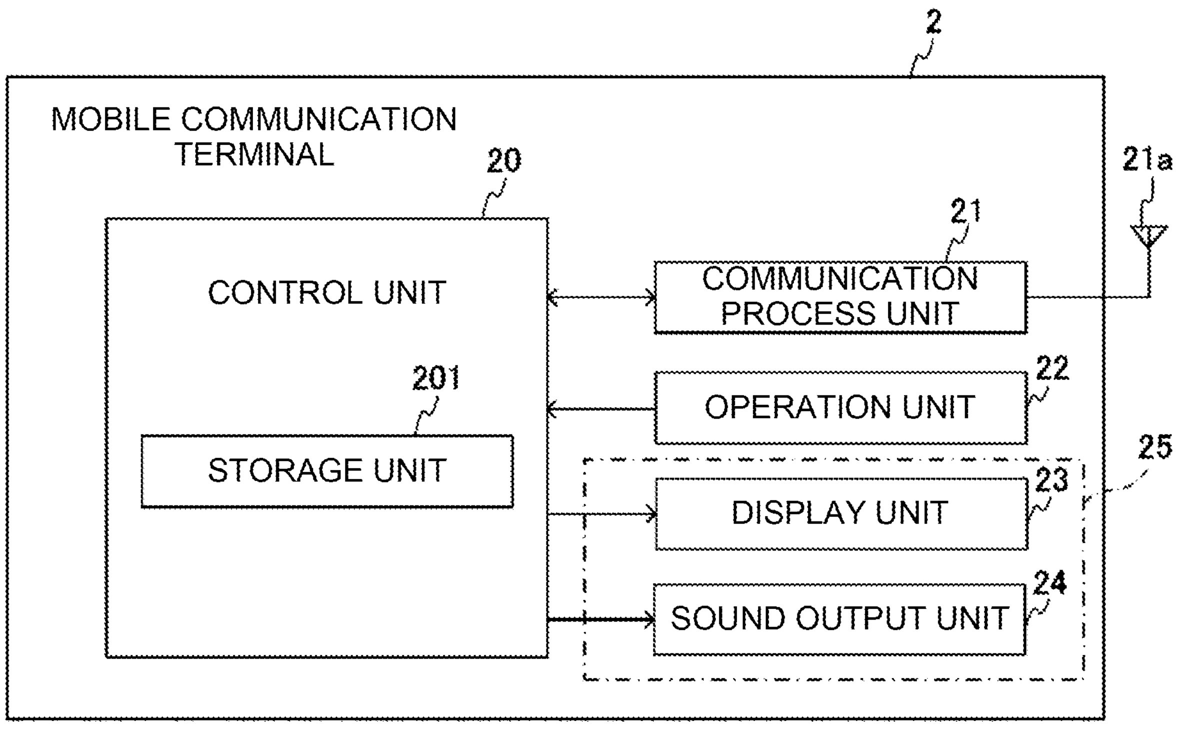
FIG. 6 is a lock diagram showing a configuration of a mobile communication terminal.

FIG. 6 is a block diagram showing a configuration of the mobile communication terminal 2 according to the embodiment of the present invention. The mobile communication terminal 2 is a tablet device, a smartphone, a laptop computer or the like. As shown in FIG. 6, the mobile communication terminal 2 includes a communication process unit 21, an operation unit 22, a display unit 23, a sound output unit 24 and a control unit 20. The communication process unit 21, the operation unit 22, the display unit 23, and the sound output unit 24 are connected to the control unit 20.

The communication process unit 21 sends and receives data to and from the work vehicle 1 via a communication antenna 21*a*. To the control unit 20, the communication process unit 21 outputs the data received from the work vehicle 1. Further, the communication antenna 21*a* is an antenna for performing a wireless communication with the work vehicle 1. Further, the mobile communication terminal 2 may be provided with a mobile communication antenna for performing the communication using the mobile telephone line and the Internet. The mobile communication terminal 2 may be so configured as to be able to perform the communication by using the mobile communication antenna provided in the work vehicle 1, even when not provided with the own mobile communication antenna, that uses the mobile phone line and the Internet. Conversely, the work vehicle 1 may be so configured as to be able to perform the communication, by using the mobile communication antenna provided in the mobile communication terminal 2, even when not provided with the own mobile communication antenna, that uses the mobile phone line and the Internet.

The operation unit 22 accepts the operator's instruction, and inputs the instruction to the control unit 20. The operation unit 22 includes at least one of a software key, such as a touch screen, and a hardware key. The touch screen is so configured as to be provided at the display unit 23, and as to be able to detect the operation by the operator's finger or the like. The hardware key may be so configured as to be placed on a side face of an enclosure of the mobile communication terminal 2 or around the display unit 23 or the like, and as to be able to detect a pressing by the user's finger or the like.

The display unit 23 properly displays information according to the instruction from the control unit 20. The display unit 23 is a liquid crystal display or an organic EL display, for example. The display unit 23 may be configured with a touch screen, in which case the display unit 23 may also serve as the operation unit 22 described above.

The sound output unit 24 properly outputs a sound in response to the instruction from the control unit 20. The sounds may include a voice and a buzzer sound. The sound output unit 24 may be so configured as to include, in detail, at least one of a speaker and a buzzer for sound/voice output.

In the embodiment of the present invention, the display unit 23 and the sound output unit 24 are included in the notification unit 25 which performs the notification by the instruction from the control unit 20. Further, the notification unit 25 may include only one of the display unit 23 and the sound output unit 24. Further, the notification unit 25 may include a unit other than the display unit 23 and the sound output unit 24. The notification unit 25 may include, for example, a light-emitting measure or a vibration-generating measure. Further, in the embodiment of the present invention, the work vehicle 1 and the mobile communication terminal 2 are respectively provided with the notification units 17 and 25, but it is also possible to provide the notification unit in only any one of the work vehicle 1 and the mobile communication terminal 2.

The control unit 20 is a computer configured by including, for example, an arithmetic unit, an input/output unit, and a storage unit 201. The arithmetic unit is a processor, a microprocessor or the like. The storage unit 201 is a main storage unit such as a ROM and a RAM. The storage unit 201 may further include a subsidiary storage unit such as an HDD or an SSD. The storage unit 201 stores various programs and data. The arithmetic unit reads out the various programs from the storage unit 201, and performs the programs. The control unit 20, in cooperation with hardware and software, for example, functions as an automatic run process unit that performs a process related to the automatic run. The processes related to the automatic run include a process related to the start and end of the automatic run, a process of creating a route required for the automatic run, and a process of setting a condition related to the automatic run, etc.; further, the control unit 20 may also perform various processes related to the notification to be described in detail below.

Further, the function realized by the control unit 20 may be realized by software or by another method. The function realized by the control unit 20 may be realized by hardware using, for example, an ASIC or an FPGA. Further, the function realized by the control unit 20 may be realized using a combination of software and hardware.

Further, in the embodiment of the present invention, the mobile communication terminal 2 is so provided as to be able to perform various processes related to the automatic run and various processes related to the notification, but at least part of the above various processes may be performed by the control unit 10 of the work vehicle 1. Conversely, at least part of the various processes performed by the control unit 10 of the work vehicle 1 may be performed by the control unit 20 of the mobile communication terminal 2. Further, at least part of the above functions possessed by the control unit 10 of the work vehicle 1 and at least part of the above functions possessed by the control unit 20 of the mobile communication terminal 2 may be realized by a combination of the control unit 10 of the work vehicle 1 and the control unit 20 of the mobile communication terminal 2. Further, at least part of the functions possessed by the control unit 20 of the mobile communication terminal 2 may be performed by the control unit 20 in cooperation with a server communicable via a network such as the Internet. Further, part of the information stored in the storage unit 201 which is possessed by the control unit 20 may be stored in an outer server.

[1-3. Remote Operation Device]

The remote operation device 3 (see FIG. 1) is used, for example, when a person other than the operator using the mobile communication terminal 2 performs the work in the farm field F. The remote operation device 3 is a simplified device that can perform fewer types of operations compared with the mobile communication terminal 2. The remote operation device 3 is so provided as to be able to communicate with the work vehicle 1 by a wireless method. The remote operation device 3 may be so configured as to be provided with such a switch that allows the person at a distance from the work vehicle 1 to start, stop, or restart the automatic run work on the work vehicle 1. It is preferable that the remote operation device 3 should be provided with a function for emergency stop of the work vehicle 1 that performs the work by the automatic run. The remote operation device 3 may be an emergency stop remote controller.

Further, in the example shown in FIG. 1, the number of remote operation devices 3 is one, may be multiple. Further, the remote operation device 3 is not an essential component of the work support system 100, and may not be provided, as the case may be. Further, the remote operation device 3 may be provided with a notification unit that provides at least one of the display notification and the sound/voice notification.

2. Details of Work Support

Then, details of the work support (work support method) performed by the work support system 100 configured as above are to be described.

[2-1. Work Support for Switching of Run Mode]

Figure 7:
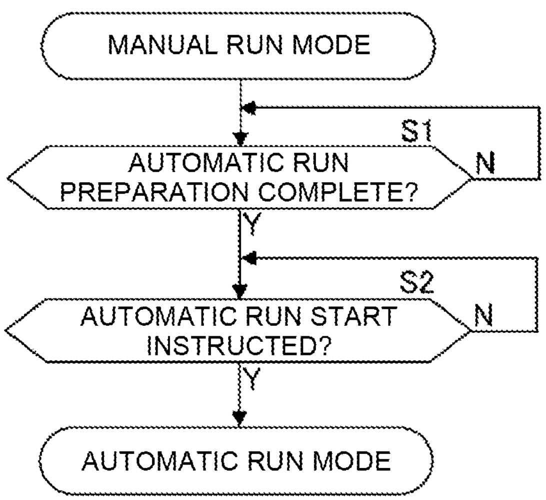
FIG. 7 is flowchart showing an example of a process of switching from a manual run mode to an automatic run mode.

FIG. 7 is a flowchart showing an example of a process of switching from the manual run mode to the automatic run mode which process is performed in the work support system 100 according to the embodiment of the present invention. Further, the work vehicle 1 is normally in the manual run mode at the time of starting the engine. Further, the example shown in FIG. 7 may be, in detail, the process in the case of switching from the manual run mode to the unmanned automatic run mode.

In step S1, the run mode control unit 102 (see FIG. 5) monitors whether or not a preparation for shifting to the automatic run mode is complete. The above preparation is completed by the operator performing a given operation on the work vehicle 1. That is, step S1 monitors whether or not a given preparing operation required for shifting to the automatic run mode is complete. The given preparing operation may be a single operation or multiple types of operations.

Further, the given preparing operation may include, for example, turning on a switch for shifting to the automatic run mode. Further, the given preparing operation may include, for example, turning on a PTO switch that performs a switching between the state of transmitting the power to the PTO shaft (on state) and the state of not transmitting the power (off state). Further, the given preparing operation may include an operation to set the speed change lever's position as a given position. The given position may be, for example, a neutral position or a minimum position.

When it is determined in step S1 that the preparation for shifting to the automatic run mode is complete (Yes in step S1), the process proceeds to a next step S2.

In step S2, the run mode control unit 102 monitors whether or not an instruction to start the automatic run mode has been made. In the present embodiment, the start instruction is realized by the operator operating the mobile communication terminal 2 or the remote operation device 3. When the start instruction is made (Yes in step S2), the run mode control unit 102 shifts the run mode to the automatic run mode. This starts the automatic run.

Then, as can be seen from the above description, the example shown in FIG. 7 does not make a switching from the manual run mode to the automatic run mode even when the operator merely operates an automatic run mode start switch in the mobile communication terminal 2 or remote operation device 3. On the condition that the given preparing operation is performed in the work vehicle 1, the switching from the manual run mode to the automatic run mode is made by operating the automatic run mode start switch in the mobile communication terminal 2 or remote operation device 3. The work support method in this example may include a configuration in which when the automatic run mode start switch is operated in a state of the given preparing operation not performed, the notification that the given preparing operation is not complete is given, for example. Further, the work support method in this example may include a configuration in which when the automatic run mode start switch is operated in a state of the given preparing operation not performed, the content of the operation for which the preparing operation is not complete is notified. The notification may be made, for example, by using the display and sound/voice of the notification units 17 and 25.

Figure 8:
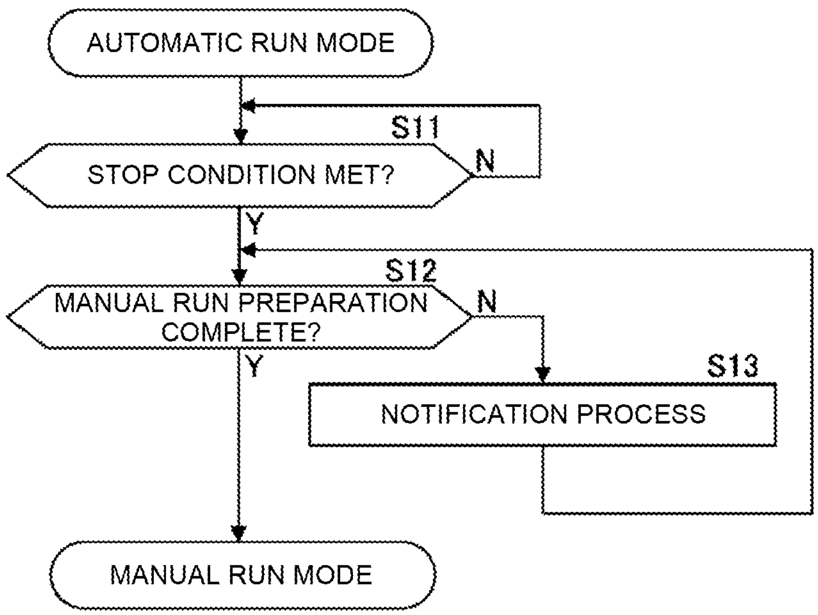
FIG. 8 is a flowchart showing an example of the process of switching from the automatic run mode to the manual run mode.

FIG. 8 is a flowchart showing an example of the process of switching from the automatic run mode to the manual run mode which process is performed in the work support system 100 according to the embodiment of the present invention.

In step S11, the run mode control unit 102 monitors whether or not the stop condition for stopping the automatic run mode is met. The stop condition is met, for example, when the operator gives an automatic run stop instruction which uses the mobile communication terminal 2 or the remote operation device 3. Further, the stop condition is met, for example, when all the work scheduled to be performed by the automatic run is complete. Further, the stop condition is met, for example, when the work vehicle 1 reaches the given position. The given positions are, for example, the position where a threshed grain of the mowed culm is discharged, the supply position where a supply stocked material such as a seedling is supplied, and so on. Further, the stop condition is met, for example, when the operator operates an operation member whose operation is prohibited during the automatic run. When it is determined that the stop condition is met (Yes in step S11), the process proceeds to a next step S12.

In step S12, the run mode control unit 102 determines whether or not a preparation required for the switching to the manual run mode (manual run preparation) is complete. The manual run preparation is completed when the operator has performed a given operation required for the switching to the manual run mode. The given operation may be a single operation, or may be multiple types of operations. The given operation is an operation that is provided, for example, due to a safety issue. Details of the given operation are to be described below. When it is determined that the manual run preparation is complete (Yes in step S12), the switching is made from the automatic run mode to the manual run mode. Meanwhile, when it is determined that manual run preparation is not complete (No in step S12), the process proceeds to step S13.

In step S13, the notification control unit 105 (see FIG. 5) performs a notification process that prompts the user to perform the given operation. The above notification process provides the notification that uses at least one of the notification unit 17 of the work vehicle 1 and the notification unit 25 of the mobile communication terminal 2. It is preferable that the notification of the given operation should be performed at least one of a sound/voice and a display. The notification of the given operation may be performed using at least any one of the display unit 15 of the work vehicle 1, the sound output unit 16 of the work vehicle 1, the display unit 23 of the mobile communication terminal 2, and the sound output unit 24 of the mobile communication terminal 2. When the process in step S13 is completed, the process returns to step S12, and the process from step S12 onward is repeated.

As can be seen from the above, the work support method of the present embodiment performs the switching from the manual run mode in which the work vehicle 1 is caused to manually run in the farm field to the automatic run mode in which the work vehicle 1 is caused to automatically run, and the notifying, when the stop condition for stopping the automatic run mode is met, the given operation required for the switching to the manual run mode. In the present embodiment, a preferable mode is to perform, when the given operation is not performed by the operator, the notification that prompts to perform the given operation. However, the notification of the given operation may be performed regardless of whether or not the given operation is being performed by the operator.

Further, the program for causing the computer to perform the work support method of the present embodiment causes the computer to function as a measure that switches the run mode from the manual run mode to the automatic run mode, and that, when the stop condition for stopping the automatic run mode is met, performs the notification of the given operation required for the switching to the manual run mode. Further, in the present embodiment, the computer is the control unit 10 of the work vehicle 1, but the computer may be at least one of the control unit 10 of the work vehicle 1 and the control unit 20 of the mobile communication terminal 2.

Further, the work support system 100 of the present embodiment is provided with the control unit 10 that performs the switching from the manual run mode to the automatic run mode, and the notification units 17 and 25 that, when the stop condition for stopping the automatic run mode is met, performs the notification of the given operation required for the switching to the manual run mode. Further, in the present embodiment, the control unit that performs the switching from the manual run mode to the automatic run mode is the control unit 10 of the work vehicle 1. However, the control unit that performs the switching from the manual run mode to the automatic run mode may be at least one of the control unit 10 of the work vehicle 1 and the control unit 20 of the mobile communication terminal 2.

As in the present embodiment, notifying the operator of the operation required for switching the run mode (given operation) makes it possible for the operator to efficiently perform the run mode switching.

Further, the work support method performed by the work support system 100 may provide a stop notification to notify the stop of the automatic run of the work vehicle 1. The stop notification may be a display (screen display) or voice, for example, "Automatic run stopped". In the configuration of performing the stop notification, the notification of the given operation required for the switching to the manual run mode may be performed after the stop notification. Creating the above configuration notifies, while causing the operator to grasp that the automatic run of the work vehicle 1 has been stopped, the operator of the content of the operation required for making the manual run mode. That is, the operator, while grasping the work vehicle 1's state, can perform the necessary operation. Further, the stop notification may be a buzzer sound. Further, the stop notification may include the buzzer sound and a voice. When the stop notification includes the buzzer sound and the voice, it may be so configured that, for example, a "Boo" is followed by the voice outputting "Automatic run stopped". The order of the buzzer sound and the voice may be reversed.

The given operation required for the switching to the manual run mode may include an operation for moving the speed change operation unit of the work vehicle 1 to the neutral position or the minimum position. The speed change operation unit may be the main speed change lever, for example. The operator, by the notification, can properly know the necessary operation in the speed change operation unit, making it possible to efficiently operate the speed change operation unit.

For example, the main speed change lever may be so configured as to make the switching between the three positions of "forward", "neutral" and "rearward" thereby to switch the proceeding direction of the work vehicle 1, and as to change the speed of the work vehicle 1 by the amount of the forward and rearward tilting. In the above configuration, the given operation may include moving the main speed change lever to the neutral position.

Further, for example, the work vehicle 1 may be so configured as to include, in addition to the main speed change lever, a reverser lever that switches between the three positions of "forward", "neutral", and "rearward" thereby to change the proceeding direction. Then, the main speed change lever may be so configured as to change the run speed (vehicle speed) in the direction indicated by the reverser lever. In the above configuration, the given operation may include moving the main speed change lever to the minimum position of minimizing the vehicle speed. Further, in this example, the reverser lever is set to the neutral position at the time of switching from the manual run mode to the automatic run mode, thus eliminating the need for operating the reverser lever so as to make the switching from the automatic run mode to the manual run mode.

Figure 9:
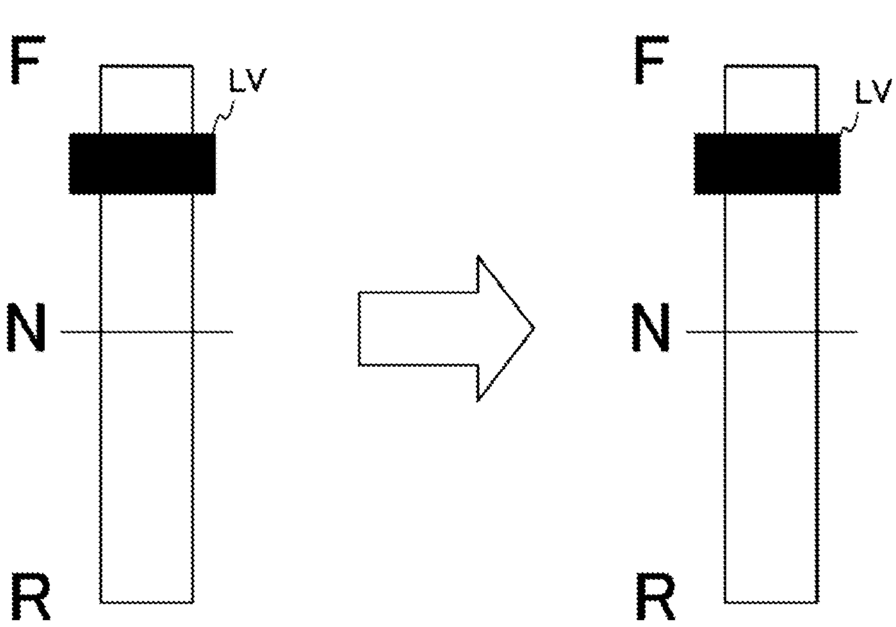
FIG. 9 is a schematic diagram showing a state of a main speed change lever.

Using, as an example, the case in which the operation for moving the main speed change lever to the neutral position is required for the switching to the manual run mode, an advantage of notifying the operation for moving the position of the speed change operation unit is to be described. FIG. 9 shows a schematic diagram showing the state of a main speed change lever LV, with "F" showing the forward position, "N" showing the neutral position, and "R" showing the rearward position. In the example shown in FIG. 9, the main speed change lever LV is tilted in the proceeding direction. The main speed change lever LV is positioned before the position where the maximum (100%) amount of the forward tilt is reached.

In FIG. 9, the left side of the white arrow shows the state of the main speed change lever LV during the automatic run, and the right side of the white arrow shows the state of the main speed change lever LV in the case of an interruption (stop) of the automatic run. The position of the main speed change lever LV is the same on the left and right side of the white arrow. That is, the position of the main speed change lever LV does not automatically move in the process from the automatic run state to the automatic run stop state. As a result, when the automatic run is stopped, the work vehicle 1's actual run state, as the case may be, is inconsistent with the position of the main speed change lever LV. Further, the automatic run in this example is assumed to be, for example, the automatic run in the manned automatic run mode described above.

So as to make the switching to the manual run mode, it is necessary to eliminate an inconsistency between the work vehicle 1's actual run state and the position of the main speed change lever LV. That is, the position of the main speed change lever LV needs to be once set to the "neutral position". Making the notification to move the position of the main speed change lever LV to the "neutral position" makes it possible that the operator is expected to efficiently make a proper operation of the main speed change lever LV. The notification may be any one of the sound/voice and the display, but it is preferable that the sound/voice notification should be included. In particular, the sound/voice notification of a specific operation content, such as "Please put the main speed change lever in the neutral position" makes it possible for the operator to easily grasp the next operation.

Figure 10:
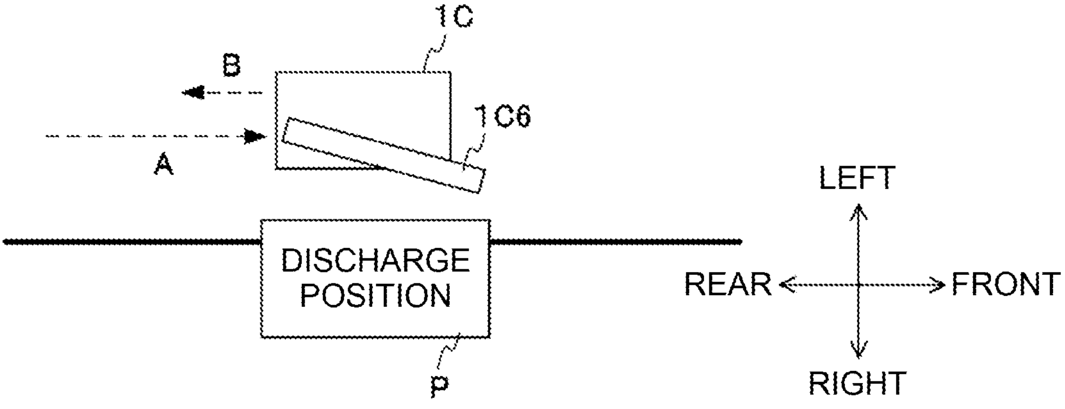
FIG. 10 is a schematic diagram for explaining about the threshed grain discharge work in the combine harvester.

FIG. 10 is a schematic view for explaining about the threshed grain discharge work in the combine harvester 1C. In the example shown in FIG. 10, the combine harvester 1C, by the automatic run, arrives at a discharge position P (precisely, near the discharge position P) on the route shown by a dashed arrow A, and stops the automatic run. Here, as shown in FIG. 9, it is assumed that the position of the main speed change lever LV is operated toward the forward position side for a reason such as increasing the vehicle speed. In this case, the mode does not return to the manual run mode unless the main speed change lever LV is moved to the neutral position after the automatic run stop. However, because the combine harvester 1C is stopped, the operator is under an illusion that the main speed change lever LV is in the neutral position, and easily forgets to move the main speed change lever LV to the neutral position.

By the way, when the combine harvester 1C reaches the discharge position P by the automatic run, the position of the discharge auger 106 is adjusted to a proper position of the discharge position P while the combine harvester 1C is moved rearward by the manual run, as shown by a dashed arrow B. In such a case such that the operator forgets that the main speed change lever LV has been operated toward the forward position side and is under the illusion that the main speed change lever LV is in the neutral position, a state may occur in which the operator operates the main speed change lever LV slightly toward the rearward side without particularly looking at the main speed change lever LV. In the above case, it may happen that the main speed change lever LV does not return to the neutral position and the combine harvester 1C does not start proceeding rearward. When the combine harvester 1C does not start proceeding rearward despite the operation of the main speed change lever LV, the operator, not knowing why the combine harvester 1C does not start proceeding rearward, may be confused. In this respect, in the present embodiment, the operator is so notified as to move the main speed change lever to the neutral position, thus making it possible to prevent the above confusion of the operator.

Figure 11:
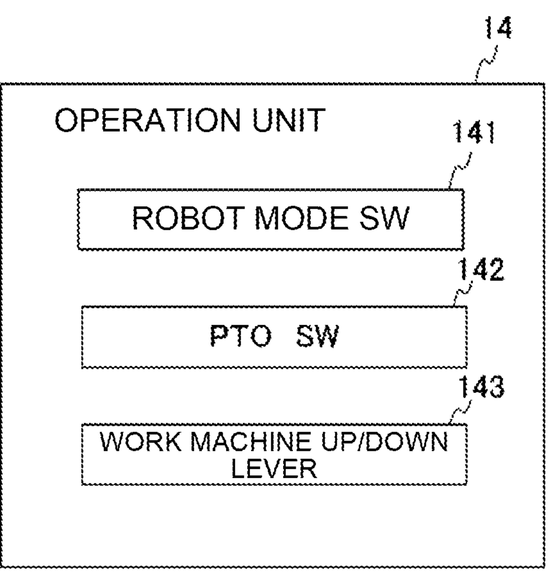
FIG. 11 is a lock diagram showing an example of the configuration of an operation unit provided in the work vehicle.

FIG. 11 is a block diagram showing an example of the configuration of the operation unit 14 provided in the work vehicle 1. In the example shown in FIG. 11, the operation unit 14 includes a robot mode switch 141, a PTO switch 142, and a work machine up/down lever 143. Further, the operation unit 14 may be so configured as to include only any one of the robot mode switch 141, the PTO switch 142, and the work machine up/down lever 143, or only any two of them. Further, the operation unit 14 may be so configured as not to include any of the robot mode switch 141, the PTO switch 142, and the work machine up/down lever 143.

The robot mode switch 141 is turned on at the time of switching from the manual run mode to the unmanned automatic run mode, and turned off at the time of switching from the unmanned automatic run mode to the manual run mode. The robot mode switch 141 is an example of a first on/off switch that is turned on and off at the time of switching between the manual run mode and the automatic run mode. The robot mode switch 141 may be a physical switch such as a button, a lever, or a dial, for example, or a software switch configured using a touch screen or the like.

When the operation unit 14 is provided with the first on/off switch, such as the robot mode switch 141, the given operation required for the switching to the manual run mode may include the operation of the first on/off switch 141. In detail, it may be so configured that when the work vehicle 1, which has been automatically running in the unmanned automatic run mode, stops running, switching to the manual run mode cannot be made unless the robot mode switch 141 is turned off. Then, it is preferable, in the above configuration, that when the stop condition is met, a notification having a content such as "Please turn off the robot mode switch" is made. The above notification may be at least any one of the sound/voice and the display, but it is preferable that the sound/voice notification should be included. This reduces the possibility of forgetting to turn off the robot mode switch 141 at the time of switching to the manual run mode, making it possible for the operator to efficiently switch the run mode.

The PTO switch 142 is turned on at the time of switching from the manual run mode to the automatic run mode, and is turned off at the time of switching from the automatic run mode to the manual run mode. The PTO switch 142 is an example of a second on/off switch that is turned on and off at the time of switching between an action and a non-action of the work machine of the work vehicle 1. The PTO switch 142 may be a physical switch, such as a button, a lever, or a dial, or a software switch configured with a touch screen or the like.

When the operation unit 14 is provided with the second on/off switch such as the PTO switch 142, the given operation required for the switching to the manual run mode may include an operation of the second on/off switch 142. In detail, it may be so configured that when the work vehicle 1, which has been automatically running in the automatic run mode, stops running, switching to the manual run mode cannot be made unless the PTO switch 142 is turned off. Then, it is preferable, in the above configuration, that when the stop condition is met, a notification having a content such as "Please turn off the PTO switch" is made. The above notification may be at least any one of the sound/voice and the display, but it is preferable that the sound/voice notification should be included. This reduces the possibility of forgetting to turn off the PTO switch 142 at the time of switching to the manual run mode, making it possible for the operator to efficiently switch the run mode.

The work machine up/down lever 143 is a lever for the operator to up or down the work machine. In the present embodiment, the work machine up/down lever 143 also serves as an operation unit for switching from the automatic run mode to the manual run mode. The work machine, for safety and the like, needs to be moved to a non-action position at the time of switching from the automatic run mode to the manual run mode. In the present embodiment, the non-action position is a position where the work machine is away from the ground and is upped above the ground by the work machine up/down lever 143.

When the operation unit 14 is provided with the work machine up/down lever 143, the given operation required for the switching to the manual run mode may include an operation to put the work machine of the work vehicle 1 in the non-action state. In detail, it may be so configured that when the work vehicle 1, which has been automatically running in the automatic run mode, stops running, switching to the manual run mode cannot be made unless the work machine is upped using the work machine up/down lever 143. Then, it is preferable, in the above configuration, that when the stop condition is met, a notification having a content such as "Please up the work machine". The above notification may be at least any one of the sound/voice and the display, but it is preferable that the sound/voice notification should be included. This reduces the possibility of forgetting to up the work machine at the time of switching to the manual run mode, making it possible for the operator to efficiently switch the run mode.

In the example shown in FIG. 11, so as to make a switching from the automatic run mode to the manual run mode, the robot mode switch 141 needs to be turned off, the PTO switch 142 needs to be turned off, and the work machine needs to be upped using the work machine up/down lever 143. That is, the given operations required for the switching to the manual run mode include multiple types of operations. When the given operations include the multiple types of operations, it is preferable that the multiple types of operations should be notified in order according to the priority. This prevents the notifications of the operation contents, which are different from each other, from being made at the same time, making it possible to prevent the operator from being confused.

The priority may be properly determined; for example, it may be so configured that among multiple types of operations, the earlier the order (time) in which the operator performed the action which requires the operation, the higher the priority. For example, assume that the robot mode switch 141 is first turned on, followed by the PTO switch 142 turned on. In this case, the notification of the operation that turns off the robot mode switch 141, which was turned on first, may take a priority over the notification of the operation that turns off the PTO switch 142, which is turned on later.

Further, as an example of the case of the manned automatic run mode, assume a state in which the automatic run mode is first turned on, and then the main speed change lever is operated, resulting in an emergency stop of the automatic run. In the above case, the notification of the operation to turn off the automatic run mode may take priority over the notification of the operation for moving the main speed change lever to the neutral position or the minimum position. With the above configuration, the operation is first performed, and the operation that is easily forgotten to be operated at the time of switching to the manual run mode is notified in priority. As a result, when multiple types of operations need to be performed, it is possible to suppress the occurrence of the forgotten operation.

[2-2. Work Support after Switching of Run Mode]

Figure 12:
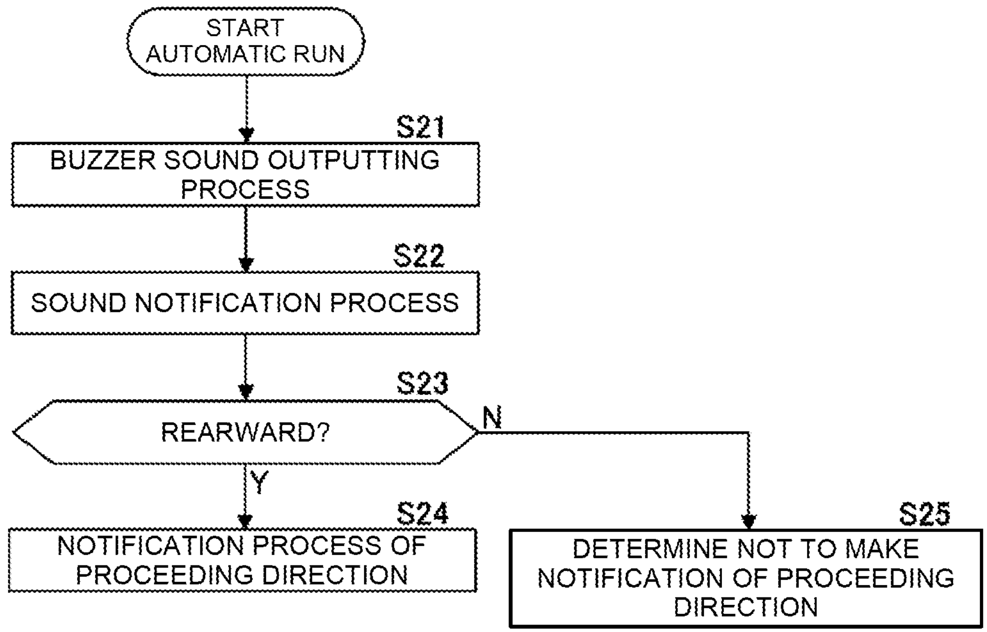
FIG. 12 is a flowchart exemplifying a work support process after the switching to the automatic run mode.

FIG. 12 is a flowchart exemplifying the work support process after the switching to the automatic run mode which process is performed in the work support system 100 according to the embodiment of the present invention. FIG. 12 explains about the work support process that is performed after the manual run mode is switched to the automatic run mode by the process shown in FIG. 7. Further, FIG. 12 shows a flowchart assuming that the automatic run mode is the unmanned automatic run mode, where the work vehicle 1 is stopped at the time of switching to the automatic run mode.

In step S21, in response to the automatic run start, the notification control unit 105 (see FIG. 5) causes the sound output unit 16 to output a buzzer sound to notify of the automatic run start (buzzer sound outputting process). The buzzer sounds three times, for example. The buzzer sound is, for example, "Boo, boo, boo". Instead of, or in addition to, the sound output unit 16 provided in the work vehicle 1; from the sound output unit 24, which is provided in the mobile communication terminal 2, via the control unit 20 of the mobile communication terminal 2, the notification control unit 105 may cause a buzzer sound to be output. Further, the buzzer sound that notifies the automatic run start, when in the manned automatic run mode, may be a sound different from in the unmanned automatic run mode, e.g., "poo, poo, poo". After the buzzer sound outputting process is performed, the process proceeds to a next step S22.

In step S22, the notification control unit 105 performs a process to cause the sound output unit 16 to notify a voice informing the automatic run start (sound/voice notification process). In other words, the work support method of the present embodiment performs an automatic run mode shift notification to notify the shift from the manual run mode to the automatic run mode. The above notification may be, for example, a sound/voice notification such as "Automatic run will start". Further, the above buzzer sound may be interpreted as being included in the automatic run mode shift notification. Once the sound/voice notification process is performed, the process proceeds to a next step S23.

Further, instead of, or in addition to, the sound output unit 16 provided in the work vehicle 1; from the sound output unit 24, which is provided in the mobile communication terminal 2, via the control unit 20 of the mobile communication terminal 2, the notification control unit 105 may cause the sound/voice to be output. Further, it may be so configured that, instead of or in addition to the sound/voice notification, a notification using the display (screen display) is performed. For performing the sound/voice notification as in the present embodiment, it is preferable to so perform the sound/voice notification as to prevent the sound/voice from overlapping the buzzer sound described above. That is, it is preferable that after the "Boo, boo, boo", a voice such as "Automatic run will start" should be reproduced. It is preferable that creating the configuration of preventing the buzzer sound from overlapping the sound/voice should be applied also to another case of the buzzer sound and the voice. The other buzzer sounds include, for example, a buzzer sound heard when the tank is full. Further, in the above configuration, the buzzer sound is followed by the voice output, but the reverse is also allowed. That is, the order of step S21 and step S22 may be reversed.

In step S23, the notification control unit 105 determines whether or not the proceeding direction of the work vehicle 1 performing the automatic run is rearward. Further, in this example, the work vehicle 1 starts the automatic run after the buzzer sound outputting and the voice notification. The proceeding direction at the automatic run start can be determined from the preset automatic run route. When the proceeding direction at the automatic run start is rearward (Yes in step S23), the process proceeds to a next step S24. When the proceeding direction at the automatic run start is not rearward (No in step S23), the process proceeds to step S25.

Further, in the case of being in the manned automatic run mode, for example, the automatic run may be started while the work vehicle 1 is running; in this case, the buzzer sound may be outputted and the sound/voice notification may be performed in the run state, and the automatic run may be started. In the above configuration, processes after step S23 need not be performed.

In step S24, the notification control unit 105 makes a notification process of the proceeding direction of the work vehicle 1. That is, when the automatic run is to be started by the rearward run, it is notified that the work vehicle 1 proceeds rearward. The above notification may be at least any one of the sound/voice and the display, but it is preferable that the sound/voice notification should be included. The above notification may be made by at least any one of the work vehicle 1 and the mobile communication terminal 2. The above notification may be "Rearward. Be careful.", for example.

In step S25, the notification control unit 105 determines not to make a notification of the proceeding direction of the work vehicle 1. That is, when the automatic run is started by the forward run, the proceeding direction of the work vehicle 1 is not notified. However, the proceeding direction of the work vehicle 1 may be notified also when the automatic run is started by the forward run.

As can be seen from the above, the work support method of the present embodiment, after the automatic run mode shift notification, performs the proceeding direction notification to notify the direction in which the work vehicle 1 proceeds. As the case may be, the person or the like around the work vehicle 1, at the automatic run start, cannot recognize whether the work vehicle 1 is to run forward or rearward. In this respect, when the proceeding direction is notified as in the present embodiment, the person or the like around the work vehicle 1, at the automatic run start, can recognize the proceeding direction of the work vehicle 1, thereby making it possible to improve safety.

Figure 13:
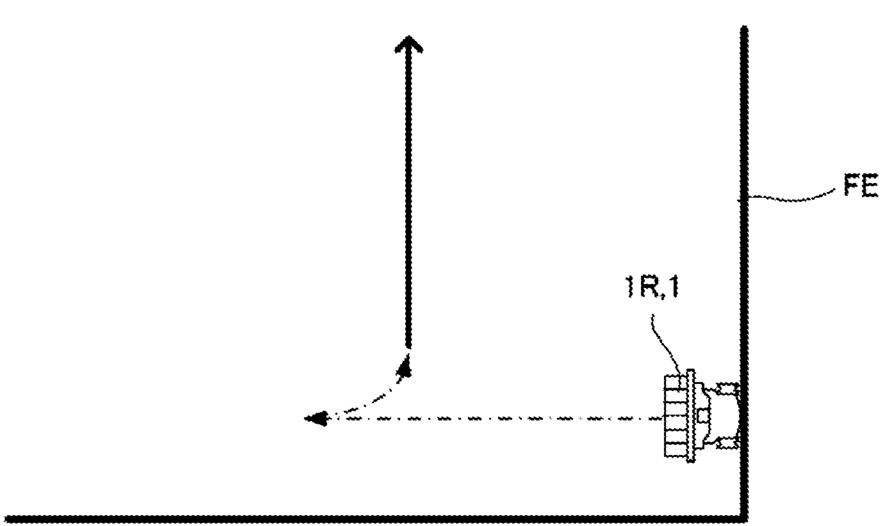
FIG. 13 is a schematic diagram showing an example of starting the automatic run rearward.
Figure 14:
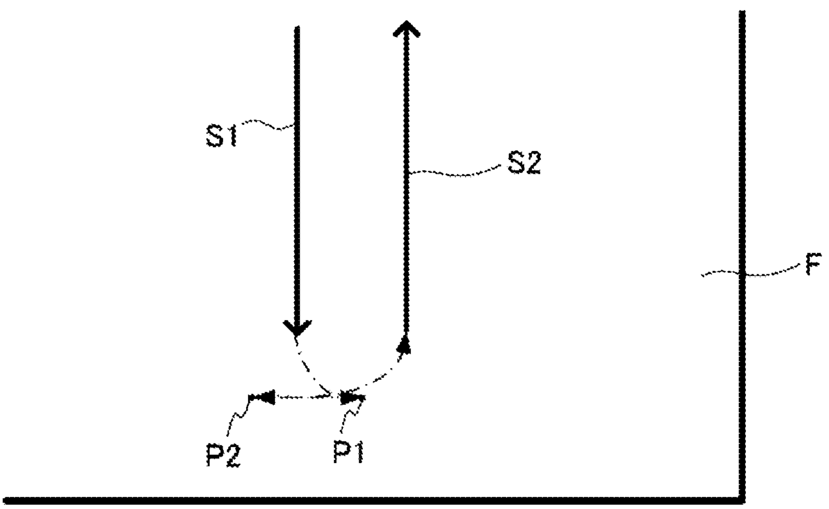
FIG. 14 is a schematic diagram showing an example of starting the automatic run rearward.

FIGS. 13 and 14 are schematic diagrams each showing an example where the automatic run is started by the rearward run. In the example shown in FIG. 13, the work vehicle 1 is stopped with the front side of the vehicle body facing a farm field end FE. The above state occurs when the work vehicle 1 is the rice planter 1R and stops so as to supply seedlings, for example. When the seedlings have been supplied and the automatic run is to be started, the automatic run is started by the rearward run. In the above case, the proceeding direction notification for notifying the direction in which the work vehicle 1 proceeds may be performed.

In the example shown in FIG. 14, it is assumed that the work on a certain straight route S1 in the farm field F is ended and the work vehicle 1 makes a left turn thereafter to go to a next straight route S2. Here, assume that a distance between the two straight routes S1 and S2 is narrow, and simply making a left turn only causes a large deviation from the next straight route S2, failing to properly enter the straight route S2. In this case, the work vehicle 1, while turning left, proceeds to a point P1, and stops once. Then, after making the stop once, the work vehicle 1 proceeds rearward to a point P2, then proceeds forward from the point P2 while turning left thereby to enter the next straight route S2. In the case of performing the above fishtail turn; at the time of proceeding rearward after the stop once, the proceeding direction notification for notifying the direction in which the work vehicle 1 proceeds may be performed.

Figure 15:
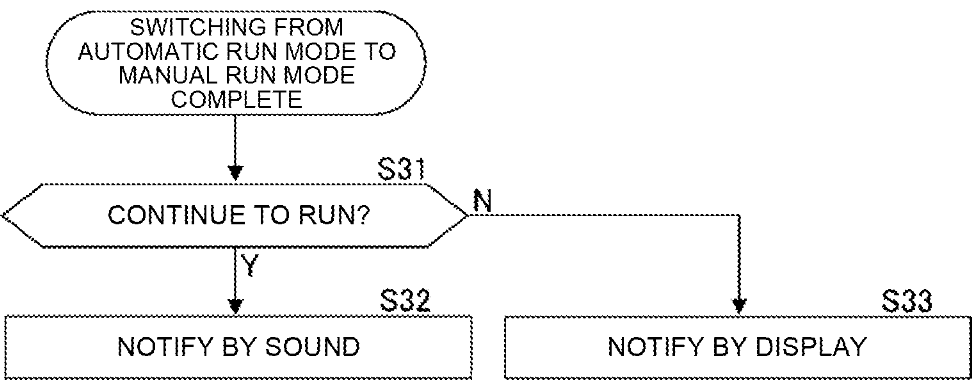
FIG. 15 is a flowchart exemplifying the work support process after the switching to the manual run mode.

FIG. 15 is a flowchart exemplifying the work support process after the switching to the manual run mode which process is performed in the work support system 100 according to the embodiment of the present invention. FIG. 15 describes the work support process performed after the automatic run mode is switched to the manual run mode by the process shown in FIG. 8.

In step S31, the notification control unit 105 determines whether or not the work vehicle 1, when the automatic run mode is switched to the manual run mode, continues to run. Whether or not the work vehicle 1 continues to run depends on how the above stop condition (see FIG. 8) is met. Details in this respect are to be described below. When the work vehicle 1 continues to run (Yes in step S31), the process proceeds to a next step S32. Meanwhile, when the work vehicle 1 stops running (No in step S31), the process proceeds to step S33.

In step S32, the notification control unit 105 causes the sound/voice to make a notification that the mode has been switched to the manual run mode. The above sound/voice notification may be, for example, "Returned to manual run".

Further, the sound/voice notification may be performed using at least any one of the sound output unit 16 provided in the work vehicle 1 and the sound output unit 24 provided in the mobile communication terminal 2. Further, in addition to the sound/voice notification, the display may also be used for the notification. In this case, however, care needs to be taken for the display mode. This respect is to be described below. Further, the notification by display may be made using at least any one of the display unit 15 provided in the work vehicle 1 and the display unit 23 provided in the mobile communication terminal 2.

In step S33, the notification control unit 105 causes the display to notify that the mode has been switched to the manual run mode. The notification by the above display, as well as the above sound/voice notification, may be, for example, "Returned to manual run". Further, the notification by display may be made using at least any one of the display unit 15 provided in the work vehicle 1 and the display unit 23 provided in the mobile communication terminal 2. Further, in addition to the display notification, it is preferable that the sound/voice notification should be made.

The sound/voice notification may be performed using at least any one of the sound output unit 16 provided in the work vehicle 1 and the sound output unit 24 provided in the mobile communication terminal 2.

When the automatic run by the automatic run mode is stopped, the sound/voice notification "Automatic run stopped" may be made, as described above. In the configuration where both the above configuration and the configuration to notify of the switch to the manual run mode are employed, completing the manual run preparation described above (see FIG. 8) in a short time may cause an overlap to part of the sound/voice notification timings. That is, originally, the sound/voice notification of "Automatic run stopped" is followed by "Returned to manual run", but there is a possibility that the timings of the sound/voice notification overlap, causing the sound/voice notification of "Automatic run stop . . . Returned to manual run. The part shown by " . . . " shows that at least part of the sound/voice notification of "Automatic run stopped" overlaps "Returned to manual run".

In view of the above respect; it is preferable that when part of the timings of notifications of multiple types of sounds causes an overlap thereby to cause a necessity to output, during the outputting of the sound of the first notification of a former timing, the sound of the second notification at the next timing, the sound of the first notification is ended in the middle and the sound of the second notification, is output after the ending with a break time period. Specifically, using the above example, it is preferable to so configure to end "Automatic run stopped" (first notification) with "Automatic run stop", and after the break time period, output "Returned to manual run" (second notification). The break period may be silent or may include a sound. For example, when the sound is a "beep", it may be "Automatic run is stop, beep, Return to manual run". Creating the above configuration prevents the sound from being overlapped, making it easier to grasp the content of the sound/voice notification.

As can be seen from the description related to FIG. 15, the work support method of the present embodiment performs switching to the automatic run mode in which the work vehicle 1 is caused to automatically run in the farm field, switching, when the given condition is met in the automatic run mode, to the manual run mode in which the work vehicle 1 is caused to manually run, and performing the switch notification to notify that the automatic run mode has been switched to the manual run mode. The mode of the switch notification differs depending on the work vehicle 1's state seen at the time of the switching to the manual run mode. Further, the specific example of the switch notification is the above "Returned to manual run".

Further, the program for causing the computer to perform the work support method of the present embodiment causes the computer to function as a measure for performing switching to the automatic run mode in which the work vehicle 1 is caused to automatically run in the farm field, switching, when the given condition is met in the automatic run mode, to the manual run mode in which the work vehicle 1 is caused to manually run, and performing the process of the switch notification to notify that the automatic run mode has been switched to the manual run mode. The mode of the switch notification differs depending on the work vehicle 1's state seen at the time of the switching to the manual run mode. As described above, the computer may be at least one of the control unit 10 of the work vehicle 1 and the control unit 20 of the mobile communication terminal 2.

Further, the work support system 100 of the present embodiment is provided with the control unit 10 that, when the given condition is met during the automatic run mode in which the work vehicle 1 is caused to automatically run in the farm field, switches to the manual run mode in which the work vehicle 1 is caused to manually run, and the notification units 17, 25 that notify that the automatic run mode has been switched to the manual run mode. The mode of the switch notification depending on the work vehicle's state seen at the time of the switching to the manual run mode. As described above, the control unit that performs the switching from the manual run mode to the automatic run mode may be at least one of the control unit 10 of the work vehicle 1 and the control unit 20 of the mobile communication terminal 2.

As in the present embodiment, when it is so configured that the mode of the switch notification differs depending on the work vehicle 1's state seen at the time of switching to the manual run mode, a proper notification that accords to the work vehicle 1's state can be provided for the operator or the like. As a result, the operator's operability is improved, making it possible to improve work efficiency.

In detail, the difference in the mode of switch notification may include at least any one of a difference in the device used for the notification and differentiating, using the same device, a way of notification. For example, the notification using the display device is different in notification mode from the notification using the sound output device. Further, even when the same display device is used for the notification, for example, the notification mode is different if the notification display methods using the display screen are different. The difference in display method may be, for example, differences in display place, display color, display size, etc. Further, even when the same sound output device is used for the notification, for example, the notification is different if the sound volume, the sound pitch or the like is different.

In the present embodiment, as a preferable configuration, the mode of the switch notification is so configured as to differ between the case in which the work vehicle 1 continues to run at the time of switching to the manual run mode and the case in which the work vehicle 1 stops running at the time of switching to the manual run mode. Further, is it so configured that when the work vehicle 1 continues to run at the time of switching to the manual run mode, the switch notification is performed using the sound/voice. This respect is to be described with reference to FIG. 16 and FIG. 17.

Figure 16:
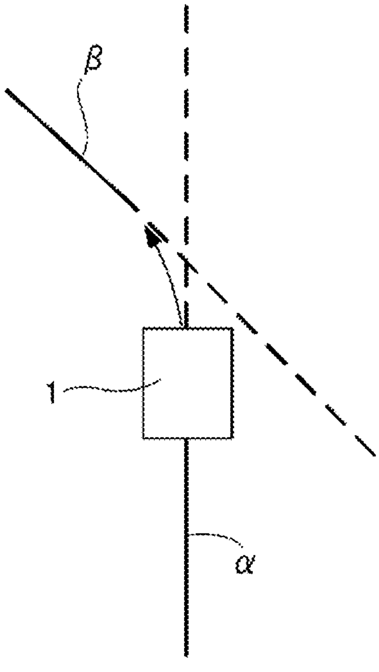
FIG. 16 is a schematic diagram for explaining an example of how the work vehicle continues to run when the switching is made from the automatic run mode to the manual run mode.

FIG. 16 is a schematic diagram for describing an example of how the work vehicle 1 continues to run at the time of switching from the automatic run mode to the manual run mode. Further, in the example shown in FIG. 16, the automatic run mode is, in detail, the manned automatic run mode, and the driver (operator) is boarding the work vehicle 1. In FIG. 16, a thick solid line is the work route. In the example shown in FIG. 16, the driver, by operating the steering wheel (handle) during the automatic run, is trying to shift the position of the work vehicle 1 from a work route α to a work route β. In the above state, stopping the run of the work vehicle 1 because of the steering operation during the automatic run will result in a rather poor work efficiency. Due to this, it is so configured as to switch, when the steering operation is performed during the automatic run, from the automatic run mode to the manual run mode while continuing the run of the work vehicle 1.

That is, in the present embodiment, the case in which the work vehicle 1 continues to run at the time of switching to the manual run mode may include a case in which the given condition for switching the automatic run mode to the manual run mode is met by an operator, who boards the work vehicle 1, performing the steering operation (the given condition). Further, the case in which the work vehicle 1 continues to run at the time of switching to the automatic run mode may include, for example, a case in which operating the reverser lever, which changes the proceeding direction during the automatic run, from the neutral position to the forward position or rearward position meets the condition for switching the automatic run mode to the manual run mode.

Figure 17:
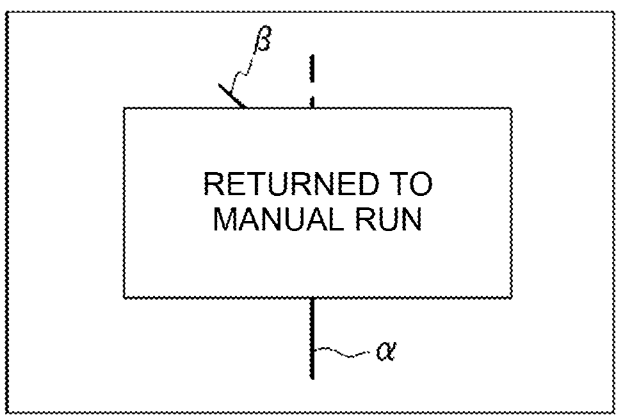
FIG. 17 is a schematic diagram for explaining an advantage of using sound/voice notification when the work vehicle continues to run.

FIG. 17 is a schematic diagram for describing an advantage of using the sound/voice notification for the switch notification when the work vehicle 1 continues to run. In the example shown in FIG. 16, the work vehicle 1 continues to run at the time of switching to the manual run mode. Due to this, there is a concern that performing the switch notification ("Returned to manual run") using the display shown in FIG. 17 hides, for several seconds, the work routes α, β displayed on the screens of the display units 15 and 23, delaying the positioning to the work route β. Further, the above several seconds is the time period for performing the switch notification, and the period may be properly set.

In this respect, so configuring, as in the present embodiment, that the sound/voice notification is used for the switch notification when the run of the work vehicle 1 is continued prevents the work routes α, β, which are displayed on the screens of the display units 15 and 23, from being hidden by the notification, thus making it possible to properly perform the positioning to the work route β. That is, the work can be efficiently performed. Further, it is sufficient that the work route displayed on the screen should be prevented from being hidden; thus, it may be so configured that the switch notification using the display should be performed by using the position which is on the screen and in which the work routes α, β are not displayed.

Further, in the present embodiment, a preferable mode is to perform, when the work vehicle 1 stops running at the time of switching to the manual run mode, the switch notification using the display. The display mode may be so configured as to display a large notification content on the screens of the display units 15 and 23, as shown in FIG. 17. The above configuration is made in view of the fact that no major problem is caused, because the run is stopped, even when the work routes α and β displayed on the screen are hidden for a few seconds, and that the conspicuous display makes it easier for the operator or the like to notice the notification.

Further, it is more preferable to perform, when the work vehicle 1 stops running at the time of switching to the manual run mode, the switch notification using the display and the sound. This allows the operator to more reliably recognize the run mode switching. In any of the continuous run and the run stop, the switch notification may be performed using the sound/voice and the display, but it is preferable that the switch notification by the display should be displayed smaller in the case of the continuous run than in the case of the run stop. It can be said that in the above configuration, the mode of the switch notification differs depending on the work vehicle 1's state.

Further, the case in which the work vehicle 1 stops running at the time of switching to the manual run mode may include, for example, a case in which the condition for switching the automatic run mode to the manual run mode is met due to an occurrence of a failure of the positioning communication unit 11 provided in the work vehicle 1 (given condition described above). Failures of the positioning communication unit 11 include, for example, reduced positioning accuracy, and inability to receive a signal from a positioning satellite. Further, the case in which the work vehicle 1 stops running at the time of switching to the manual run mode may include, for example, a case in which the condition for switching the automatic run mode to the manual run mode is met by an obstacle sensed by an obstacle sensor provided in the work vehicle 1. Obstacles may be a moving body or a stationary matter, e.g., a person, any other work vehicle, a farm tool, a rock, etc.

When the automatic run mode is switched to the manual run mode and the work vehicle 1 continues to run, a specific state requiring an alert may be caused. It is preferable that when the above specific state should occur, the operator is notified that the above specific state has been caused. Specific states include, for example, a state in which the vehicle speed of the work vehicle 1 is limited. Further, the specific states include, for example, a state in which the position of the main speed change lever is not aligned with a run direction of the work vehicle 1. The above are to be described in detail below.

Figure 18:
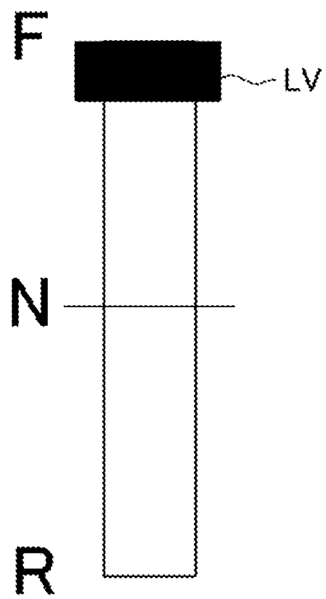
FIG. 18 is a schematic diagram to explain a state of a main speed change lever.

First, the example of causing the vehicle speed limit is to be described. Assume that when the automatic run mode is switched to the manual run mode by the steering operation (see FIG. 16), the main speed change lever LV's amount of tilting to the forward direction is at its maximum (100%), as shown in FIG. 18. Then, assume a state in which during the automatic run, preliminarily setting the vehicle speed limit using the operation unit 22, etc. of the mobile communication terminal 2 causes the run speed of less than 100% despite the main speed change lever being set to 100%. The speed less than 100% may be, for example, 50% speed, etc.

In the above assumption, the work vehicle 1 suddenly accelerates at the time of switching from the automatic run to the manual run due to the steering operation during the automatic run. This is not preferable from a safety standpoint. Due to this, it is so configured that the work vehicle 1 of the present embodiment automatically limits, for preventing the sudden acceleration, the vehicle speed at the time of switching from the automatic run mode to the manual run mode. The vehicle speed limit may be, for example, 50% of the maximum vehicle speed, as described above.

When the above vehicle speed limit is performed, the operator may feel uncomfortable because the position of the main speed change lever LV does not match the actual speed of the work vehicle 1. Due to this, in the present embodiment, it is so configured as to notify that the vehicle speed is limited. That is, the work support method of the present embodiment is so configured as to perform, after the condition for switching the automatic run mode to the manual run mode is met by the steering operation and the switch notification is performed, a vehicle speed limit notification to notify that the vehicle speed of the work vehicle 1 is limited. The vehicle speed limit notification may be at least any one of the sound/voice and the display, but it is preferable that the sound/voice notification should be included. The vehicle speed limit notification may be performed by at least any one of the work vehicle 1 and the mobile communication terminal 2.

The vehicle speed limit notification may be, for example, "Vehicle speed is being limited". When the vehicle speed is limited, the vehicle speed may be gradually increased so that the final vehicle speed corresponds to the position of the main speed change lever LV. In the above configuration, the time period during which the vehicle speed is gradually increasing may also be included in during the speed limit. Then, in the above configuration, the notification that the vehicle speed is being limited may be automatically stopped when the vehicle speed of the work vehicle 1 reaches the speed that corresponds to the position of the main speed change lever LV.

The following is an example of causing a state in which the position of the main speed change lever LV and the run direction of the work vehicle 1 do not match, as described above. For example, assume that the main speed change lever LV is operated in the forward direction during the rearward run in the fishtail turn (see FIG. 14), and the run mode is switched from the automatic run mode to the manual run mode while the work vehicle 1 continues to run.

In this case, due to the changing from the automatic run to the manual run in the state of the main speed change lever LV being in the forward position, the work vehicle 1 suddenly starts running forward from running rearward. In the present embodiment, it is so configured that the shift to the forward run is notified in view of safety and the like. That is, the work support method of the present embodiment is so configured as to perform, in the case of switching to the manual run mode at the time of the work vehicle 1 running rearward in the automatic run mode, after the performing of the switch notification, the forward run notification to notify that the work vehicle runs forward. This allows the operator and the person around the work vehicle 1 to properly grasp the shift from the rearward run to the forward run.

The forward run notification may be at least any one of the sound/voice and the display, but it is preferable that the sound/voice notification should be included. The forward run notification may be made by at least any one of the work vehicle 1 and the mobile communication terminal 2. The forward run notification may be, for example, "Will start running forward".

Further, it is preferable that when the forward run is started from the rearward run as above, the vehicle speed should be limited for safety reason and the like. To this end, it is preferable that the work support method should perform, after the performing of the forward run notification, the vehicle speed limit notification to notify that the vehicle speed of the work vehicle 1 is limited. This can suppress the operator from being confused.

[2-3. Notification Mode as Work Support]

The work support method of the present embodiment performs making the notification about the work vehicle 1, and setting the notification mode according to the setting by the user or according to the work vehicle 1's state. The notification about the work vehicle 1 may include at least one of the notification about various actions performed in the work vehicle 1, the notification about the operation to be performed by the operator and the like on the work vehicle 1, and the notification about the mobile communication terminal 2 and the remote operation devices 3 which are used in conjunction with the work vehicle 1. The various actions may include control actions as well as appearing actions of the work vehicle 1. It is preferable that the notifications about the work vehicle 1 should include a notification about the automatic run. Further, the users may broadly include any person who uses the work support system 100 of the present embodiment, for example, the operator.

Further, the program that causes the computer to perform the work support method of the present embodiment causes the computer to function as a measure for making the notification about the work vehicle 1, and setting the notification mode according to the setting by the user or according to the work vehicle 1's state. As described above, the computer may be at least one of the control unit 10 of the work vehicle 1 and the control unit 20 of the mobile communication terminal 2.

Further, the work support system 100 of the present embodiment is provided with the notification units 17, 25 that make the notification about the work vehicle 1, and the control unit that sets the notification mode according to the setting by the user or according to the work vehicle 1's state. Further, the control unit may be at least one of the control unit 10 of the work vehicle 1 and the control unit 20 of the mobile communication terminal 2.

Creating the above configuration allows for the notification that accords to the user's preference. Further, creating the above configuration allows for a proper notification that accords to the state of the work vehicle 1. That is, it is possible to perform proper guidance in the work vehicle 1 that is so provided as to be able to automatically run.

Further, the notification mode may include at least any of presence or absence of the sound/voice notification, sound/voice notification volume, the number of repetitions of the sound/voice notification, repetition time of the sound/voice notification, intonation of the sound/voice notification, sound/voice notification speed, sound/voice pitch of the sound/voice notification, gender of voice of the sound/voice notification, and selection of output source in the case of multiple sound output sources.

The multiple sound output sources may include, for example, the sound output unit 16 of the work vehicle 1, the sound output unit 24 of the mobile communication terminal 2, and the sound output unit (not shown) provided in the remote operation device 3. The sound output unit may be a speaker, in detail. When the work vehicle 1 is provided with an interior space such as a cabin, the sound output unit 16 of the work vehicle 1 may include an interior speaker and an exterior speaker.

For example, when the automatic run is being performed in the automatic straight ahead mode or the manned automatic run mode in each of which the operator is present in the cabin, the interior speaker may be selected from the multiple sound output sources. When the mobile communication terminal 2 is brought into the cabin, the speaker of the mobile communication terminal 2 may be selected instead of, or in addition to, the interior speaker. When the mobile communication terminal 2 is brought into the cabin, only the interior speaker may be selected.

For example, in the case of the unmanned run mode, the speaker of the mobile communication terminal 2 or the speaker of the remote operation device 3 may be selected from the multiple sound output sources. In the case of the unmanned run mode and when the contents to be notified are those that should be notified to the surrounding of the work vehicle 1, the outer speaker may be selected. Further, the contents that should be notified to the surrounding of the work vehicle 1 include, for example, notifying the person around the work vehicle 1 that the person is at risk.

(2-3-1. User's Setting of Notification Mode)

The user's setting of the notification mode is performed, for example, by using the operation unit 22 of the mobile communication terminal 2. However, the setting of the notification mode may be performed by using a unit other than the mobile communication terminal 2, for example, by using the operation unit 14 of the work vehicle 1.

Figure 19:
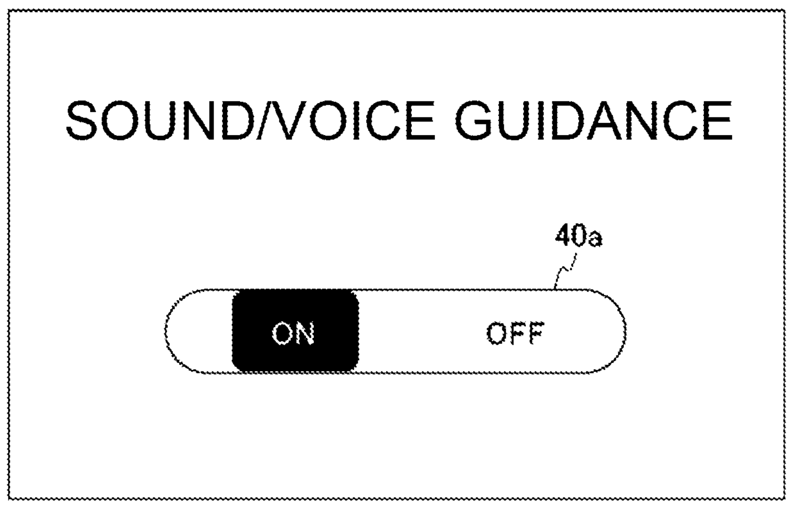
FIG. 19 shows an example of a setting screen for setting whether or not the sound/voice notification is present.
Figure 20:
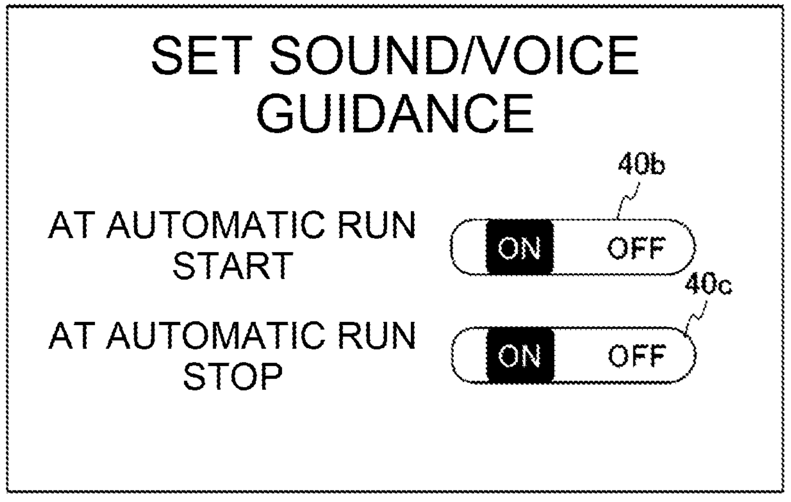
FIG. 20 shows an example of a setting screen for individually setting whether or not the sound/voice notification is present.

FIGS. 19 to 24 are examples of setting screens used by the user for setting the notification mode. FIG. 19 shows an example of a setting screen for setting the presence or absence of the sound/voice notification. When "ON" is selected in a setting unit 40*a* of the setting screen shown in FIG. 19, the sound/voice notification, for all matters that are preliminarily subject to the sound/voice notification, is performed at the timing for performing the sound/voice notification. When "OFF" is selected in the setting unit 40*a* of the setting screen shown in FIG. 19, the sound/voice notification, for all matters that are preliminarily subject to the sound/voice notification, is prevented from being performed. For example, a touch screen, a mouse, a button, a lever, a dial, etc. may be used for operating the setting unit 40*a*. The setting of presence or absence of the sound/voice notification may be individually settable for at least one of the matters that are preliminarily subject to the sound/voice notification. FIG. 20 shows an example of a setting screen for individually setting presence of absence of the sound/voice notification. FIG. 20 is so configured as to set presence or absence of the sound/voice notification at the start and stop of the automatic run. When "ON" is selected in a setting unit 40*b* which is present to the right of "At automatic run start", the sound/voice notification is made at the automatic run start. When "OFF" is selected in the setting unit 40*b* of "At automatic run start", the sound/voice notification is not made at the automatic run start. When "ON" is selected in a setting unit 40*c* which is present to the right of "At automatic run stop", the sound/voice notification is made at the automatic run stop. When "OFF" is selected in the setting unit 40*c* of the "At automatic run stop", the sound/voice notification is not made at the automatic run stop.

For the individual setting for the presence or absence of the sound/voice notification, it is preferable to be able to make for at least any one of the individual timings when the work vehicle 1's action state changes. That is, it is preferable that the setting which the user can make should include a setting of whether or not to perform the sound/voice notification at the timing of a change in the work vehicle 1's action state. The timing of the change in action state can be, for example, the timing of the switch between the automatic run mode and the manual run mode, the timing of the switch between the forward run and the rearward run, the timing of the switch between the forward run and the run stop, or the timing of the switch between the rearward run and the run stop, etc.

Figure 21:
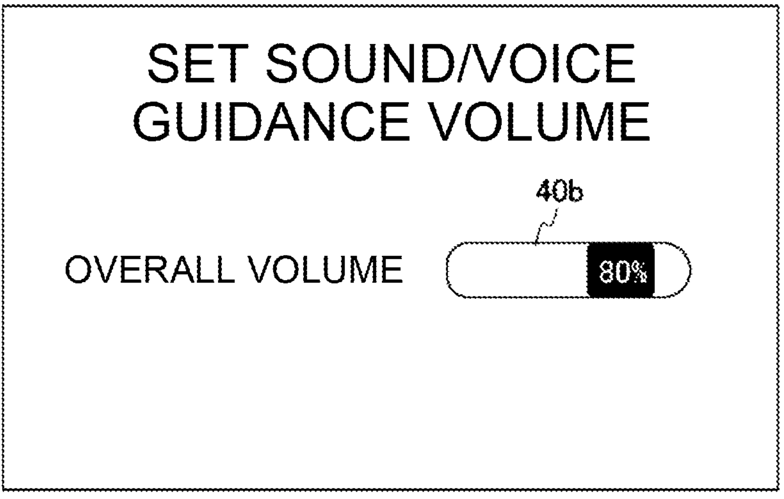
FIG. 21 shows an example of a setting screen for setting the sound/voice notification volume.

FIG. 21 shows an example of a setting screen for setting the sound/voice notification volume. In the example shown in FIG. 21, the sound/voice notification volume can be set between 0% and 100% in a setting unit 40*d* which is present to the right of "Overall volume". The example shown in FIG. 21 shows the overall volume setting of 80%, causing that the volume during the sound/voice notification of all matters subject to the sound/voice notification is 80% of the maximum volume.

Figure 22:
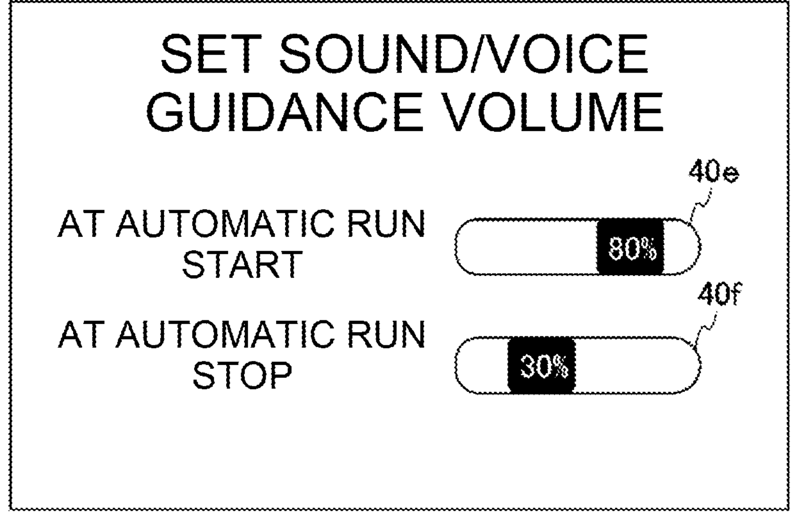
FIG. 22 shows an example of a setting screen for individually setting the sound/voice notification volume.

The volume setting may also be individually settable for at least one of the matters that are subject to the sound/voice notification. FIG. 22 shows an example of a setting screen for individually setting the sound/voice notification volume. FIG. 22 is so configured as to set the sound/voice notification volume at the start and stop of the automatic run. A setting unit that is present to the right of "At automatic run start" can set the sound/voice notification volume at the automatic run start between 0% and 100%. Further, a setting unit 40*f* that is present to the right of "At automatic run stop" can set the sound/voice notification volume at the automatic run stop between 0% and 100%. In FIG. 22, the sound/voice notification volume at the automatic run start is set to 80%, and the sound/voice notification volume at the automatic run stop is set to 30%.

Figure 23:
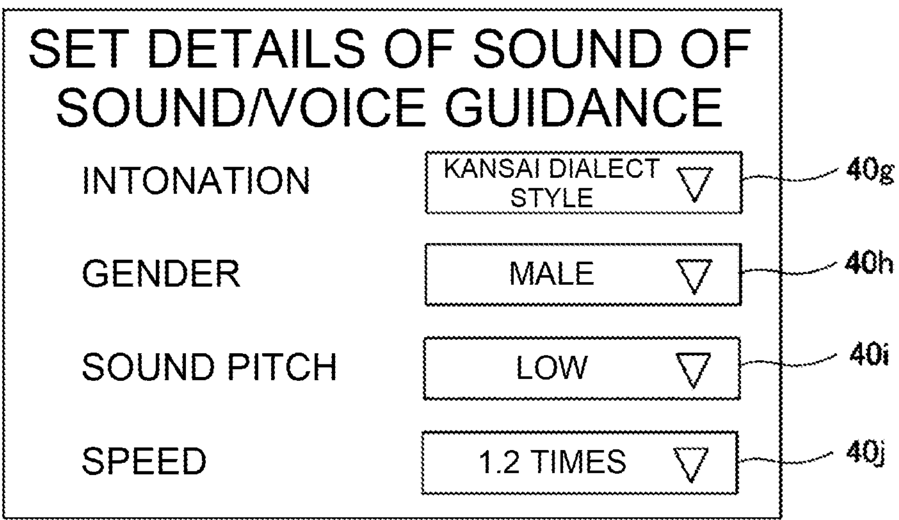
FIG. 23 shows an example of a setting screen for setting details of the sound/voice notification.

FIG. 23 shows an example of a setting screen for setting the details of the sound of the sound/voice notification. In FIG. 23, as an example, a sound/voice intonation, a sound gender, a sound/voice pitch, and a sound/voice speed can be set. By using, as an example, setting units 40*g* to which are present to the right of respective items, the setting for each item can be selected from multiple items. In the example shown in FIG. 23, "Kansai dialect style" is selected as the sound intonation. Further, "Male" is selected as the gender of the voice. Further, "Low" is selected as the voice pitch. Further, "1.2 times" is selected as the sound/voice speed. The sound/voice speed may be set to "1.0 time" for normal. For example, it may be so configured that, according to the setting of each item, the corresponding sound source data is selected from multiple sound source data preliminarily stored in the storage units 101 and 201.

Further, the detailed sound setting may also be individually settable for at least one of the matters that are subject to the sound/voice notification.

Figure 24:
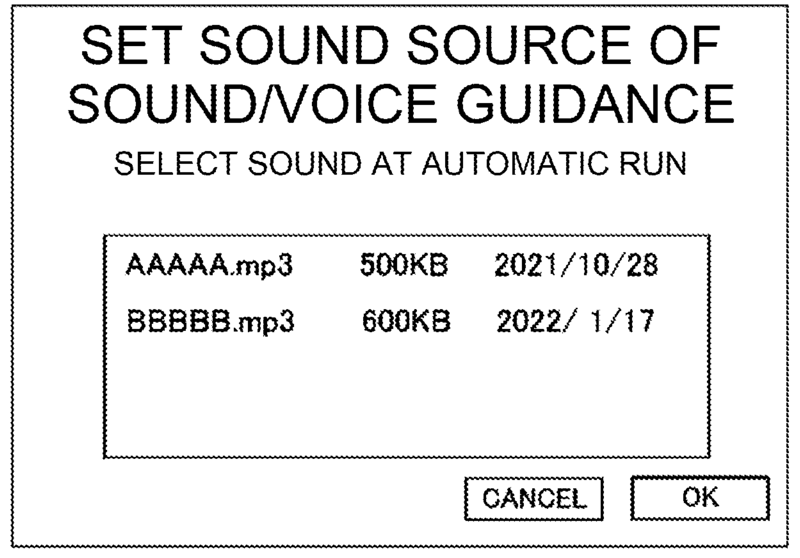
FIG. 24 shows an example of a setting screen for setting sound source data to be used for the sound/voice notification.

FIG. 24 shows an example of a setting screen for setting the sound source data used for the sound/voice notification. The example shown in FIG. 24 assumes that sound source data other than the default prepared sound source data is used. The user can, from the cloud, for example, download the sound source data, which the user wants to use, to the storage unit 101 of the work vehicle 1 and the storage unit 201 of the mobile communication terminal 2, and can use the sound source data. In the example shown in FIG. 24, the user's preferred sound source data can be selected as the sound to be used during the automatic run. Selecting, by touching, for example, the sound source data to be used, followed by operating "OK" causes the selected sound source data to be used for the sound/voice notification during the automatic run.

(2-3-2. Notification Mode Setting that Accords to State of Work Vehicle)

Figure 25:
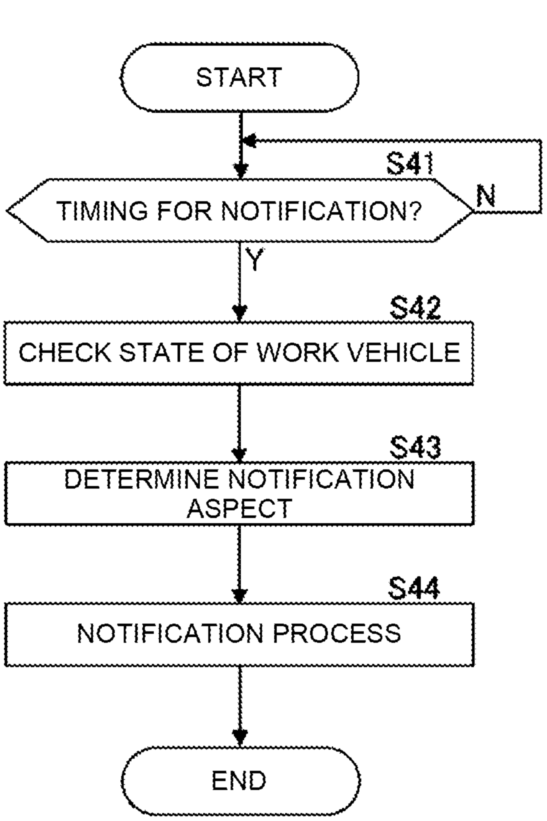
FIG. 25 is a flowchart showing a setting process of a notification mode which accords to the state of the work vehicle.

FIG. 25 is a flowchart exemplifying the process of the notification mode setting that accords to the work vehicle 1's state which process is performed in the work support system 100 according to the embodiment of the present invention.

In step S41, the notification control unit 105 (see FIG. 5) monitors whether or not it is the timing for the notification (e.g., the sound/voice notification). The timing of the notification may be configured to be preliminarily determined by the setting, for example. When it is determined that it is the timing for the notification (Yes in step S41), the process proceeds to a next step S42.

In step S42, the notification control unit 105 checks the work vehicle 1's state. The work vehicle 1's state may include, in addition to the state of the work vehicle itself, for example, the state (relation) between the work vehicle 1 and the object present around the work vehicle 1, or the state between the work vehicle 1 and the device communicable with the work vehicle 1. The objects present around the work vehicle 1 may be a moving body such as a person or any other work vehicle, or a stationary object such as a farm crop or a stone. The device communicable with the work vehicle 1 may be the mobile communication terminal 2 or the remote operation device 3. The number of items to be checked as the state of the work vehicle 1 may be single or multiple. The items to be checked as the state of the work vehicle 1 will be exemplified below. Once the state of the work vehicle 1 is checked, the process proceeds to a next step S43.

In step S43, the notification control unit 105 sets the notification mode according to the work vehicle 1's state checked earlier. The configuration of how the notification mode is so configured as to be set depending on the work vehicle 1's state may be preliminarily set. The above setting may also be configured to be changeable according to the user's preference. When the user has set the notification mode for the notification that has been put in the timing of the notification in step S41, the notification mode set by the user may take priority over the notification mode determined according to the work vehicle 1's state. Conversely, even when the notification mode has been set by the user for the notification that has been put in the timing of the notification in step S41, the notification mode determined according to the work vehicle 1's state may take priority over the notification mode set by the user. Further, depending on the content to be notified, it may be individually determined which of the following notification modes has priority: the notification mode determined according to the work vehicle 1's state, and the notification mode set by the user. Once the notification mode is set, the process proceeds to a next step S44.

In step S44, the notification control unit 105 performs the notification process so that the notification is performed in the set notification mode. This makes the notification using a proper speaker, etc.

The following is a specific example.

Checking of the work vehicle 1's state may be, for example, checking whether or not the work vehicle 1 is running. The above checking can be performed using the vehicle speed sensor or the like provided in the work vehicle 1. Then, the notification mode may be changed depending on whether or not the work vehicle 1 is running. When the work vehicle 1 is running, for example, the sound/voice notification volume may be larger than when the work vehicle 1 is stopped. This allows the notification mode to accord to the work state.

Further, checking of the work vehicle 1's state may be, for example, checking of at least any one of the drive state of the engine of the work vehicle 1 or the action state of the work machine. The drive state of the engine can be checked by a sensor or the like that measures the engine speed. The action state of the work machine can be checked, for example, by the state of the operation button or the operation lever which are used for moving each of the work machines. Then, the notification mode may be changed according to at least any one of the drive state of the engine of the work vehicle 1 and the action state of the work machine. When the engine speed of the work vehicle 1 is higher than when the engine speed is lower, for example, the sound/voice notification volume may be larger. Further, when the work machine is acting than when not acting, the sound/voice notification volume may be larger. This allows the notification mode to accord to the work state.

The work machine may be, for example, the mowing unit 1C7 and threshing device 1C3 of the combine harvester 1C. Further, the work machine may be the cultivating machine 1T2, a plow, a fertilizer applicator, a mower, or a seeder that is mounted on the rear part of the tractor 1T. Further, the work machine may be the planting unit 1R2 or the like of the rice planter 1R.

Further, checking of the work vehicle 1's state may be, for example, checking of at least one of the environment surrounding the work vehicle 1 and the action which the work vehicle 1 is scheduled to perform. The surrounding environment can be checked, for example, by an obstacle sensor. Further, the action which the work vehicle 1 is scheduled to perform can be checked in the case of the automatic run mode. Then, the notification mode may be changed according to at least one of the environment surrounding the work vehicle 1 and the action which the work vehicle 1 is scheduled to perform. Preliminary checking the environment surrounding the work vehicle 1 and the action which the work vehicle 1 is scheduled to perform makes it possible to predict the risk level of the work vehicle itself and the risk level that the work vehicle causes to its surrounding. Due to this, the configuration of the present embodiment can set the notification mode according to the risk level.

When there is an obstacle such as a person on the run route of the work vehicle 1, for example, the sound/voice notification volume may be larger than usual. Further, as the work vehicle 1 approaches the obstacle such as a person, for example, the sound/voice notification volume may be increased. Further, when the work vehicle 1 is running in the automatic straight ahead mode, for example, the sound/voice notification volume may be increased as the vehicle approaches the outer edge of the farm field. Further, when the work vehicle 1 is scheduled to next perform a high-risk action such as running rearward, making a sharp turn, or turning the discharge auger 106 (see FIG. 2A, etc.), for example, the sound/voice notification volume may be larger than usual. Instead of increasing the volume, the sound/voice notification speed may be increased, the intonation of the sound/voice notification may be emphasized, the number of repetitions of the sound/voice notification may be increased, or the repetition time of the sound/voice notification may be increased, for example.

Further, checking of the work vehicle 1's state may be, for example, checking of the vehicle speed of the work vehicle 1. The above checking can be performed using the vehicle speed sensor or the like provided in the work vehicle 1. Then, the notification mode may be changed according to the vehicle speed of the work vehicle 1. For example, the sound/voice notification volume may be increased as the vehicle speed of the work vehicle 1 increases. This makes it easier to hear the sound/voice notification and to avoid a risk.

Further, checking of the work vehicle 1's state may, for example, be checking of the type of the automatic run mode. The type of the automatic run mode can be checked by the setting at the automatic run start. Then, the notification mode may be changed depending on whether the manned automatic run with the operator boarding the work vehicle 1 or the unmanned automatic run without the operator. Further, the manned automatic run referred to here may include both the automatic run in the automatic straight ahead mode and the automatic run in the manned automatic run mode. This allows for the proper sound/voice notification that accords to the operator's place.

For example, the sound output source may be changed between the manned automatic run and the unmanned automatic run, as described above. Further, for example, in the case of the unmanned automatic run, the volume of the sound/voice notification to the surrounding of the work vehicle 1 may be larger than in the case of the manned automatic run. Further, for example, the instruction content given by the notification may be more detailed in the case of the manned automatic run than in the case of the unmanned automatic run. That is, in the case of the manned automatic run, even a detailed action may be sequentially notified compared with in the case of the unmanned automatic run. Further, for example, in the manned automatic run; when the operator is prompted to operate the operation units 14 and 22, the notification may be repeated until the above operation is performed or an operation to stop the notification is made. Further, for example, in the manned automatic run; it may be so configured as to continue to perform the notification which uses a screen display even after the operation to stop the sound/voice notification is performed, or so configured as to repeat the sound/voice notification by a snooze function.

For example, it may be so configured that, in the unmanned automatic run, only the most emergent notification content is notified. Whether or not being emergent can be determined by preliminarily classifying each of the notification contents and storing the thus classified in the storage units 101 and 201. The highly emergent notification content includes, for example, a notification of an emergency stop of the work vehicle 1 due to an error. Further, for example, in the unmanned automatic run; the operator may not be near the mobile communication terminal 2, so the notification may be repeated until the operation to stop the notification is performed, or the notification may be repeated at a given time interval.

Further, checking of the work vehicle 1's state may be, for example, checking of the number of repetitions of or the repetition time of the sound/voice notification from the start of the sound/voice notification. Then, the notification mode may be changed according to the number of repetitions of or the repetition time of the sound/voice notification from the start of the sound/voice notification. For example, the sound/voice notification volume may be increased as the number of repetitions or the repetition time increases. Further, for example, as the number of repetitions or the repetition time increases, the sound/voice notification speed may be increased or the time interval of the sound/voice notification may be reduced. Further, for example, as the number of repetitions and the repetition time increases, the intonation of the sound/voice notification may be emphasized.

Further, checking of the work vehicle 1's state may be, for example, at least any one of the number of devices communicable with the work vehicle 1, or the distance from the work vehicle 1 to the above devices. The device communicable with the work vehicle 1 may be, for example, the mobile communication terminal 2 or the remote operation device 3. The distance between these devices and the work vehicle 1 may be checked, for example, using a GPS (Global Positioning System) sensor. When the remote operation device 3 does not have the GPS sensor, for example, the distance between the remote operation device 3 and the work vehicle 1 may be determined by checking the position of the remote operation device 3 via the operator's possessing mobile terminal such as a smart phone communicable with the remote operation device 3.

Then, the notification mode may be changed according to at least one of the number of devices 2, 3 communicable with the work vehicle 1 and the distance from the work vehicle 1 to the devices 2 and 3. As the distance between the work vehicle 1 and the communicable devices 2 and 3 increases, for example, the sound/voice notification volume of the exterior speaker may be increased. Here, it may be so configured that when there is more than one device communicable with the work vehicle 1, the notification is made in order of proximity. For example, when the notification content is an instruction for taking a recovery action from the caused error, the notification to the communicable device may be stopped at the time point of having made the recovery action for the error. Then, it may be so configured as to notify the device, which has already been notified of the instruction for taking the above recovery action from the error, of the recovery action having been taken for the error.

(2-3-3. Specific Examples of Sound/Voice Notification)

The following are exemplifications of the types of sound/voice notifications applied to the work support system 100 of the present embodiment. FIGS. 26A and 26B are tables that exemplify the sound/voice notifications commonly applied when the work vehicle 1 provided in the work support system 100 is any of the combine harvester 1C, the tractor 1T, and the rice planter 1R.

Nos. 1 to 6 in FIG. 26A are sound/voice notifications about the preparation for enabling the work by the automatic run. Nos. 1 and 2 are sound/voice notifications about the positioning communication unit 11. No. 1 notifies a decrease in positioning accuracy, and No. 2 notifies that high accuracy positioning is possible. Nos. 3 and 4 are sound/voice notifications about the registration of the direction of the work vehicle 1. No. 3 prompts the registration of the direction, and No. 4 notifies the registration completion. Further, it may be so configured that a sound "RTK is available. Please start initialization." which is a combination of No. 2 and No. 3 is notified. No. 5 prompts the user to check the safety brake before the automatic run. The color monitor is, for example, the display unit 15 provided in the work vehicle 1. No. 6 prompts the selection of the farm field where the work is to be performed by the automatic run.

Nos. 7 to 12 in FIG. 26A are sound/voice notifications about the registration of the farm field for the work by the automatic run. Nos. 7 and 8 are sound/voice notifications about the start and completion of the farm field measurement work using the work vehicle 1. No. 9 notifies the interruption of the started farm field measurement, and No. 10 notifies the restart of the interrupted farm field measurement. The interruption occurs, for example, due to the presence of the obstacle or decrease in the positioning accuracy. Nos. 11 and 12 are sound/voice notifications performed when the farm field measurement is completed and the farm field is registered; in detail, they are sound/voice notifications to check the registration content.

Nos. 13 to 28 in FIG. 26A are sound/voice notifications about the work by the automatic run, and relate to the sound/voice notification of the route generation and the sound/voice notification outputted from the start to end of the work by the automatic run. No. 13 prompts for the work required to generate the route in automatic straight ahead mode. No. 14 notifies the automatic run start, and No. 15 notifies the automatic run stop. Nos. 16, 21 to 24 notify the work vehicle 1's state during the automatic run. Further, the sensitivity limit of No. 21 means that the steering sensitivity is limited according to the vehicle speed. Further, the route deviation of No. 22 shows the work vehicle 1's positional deviation relative to the automatic run route. Further, No. 24 includes an operation instruction which is based on the work vehicle 1's state. No. 17 makes an alert based on the surrounding state of the work vehicle 1. No. 18 notifies that the run mode has returned from the automatic run mode to the manual run mode. No. 19 makes a notification of the completion of the scheduled work by the automatic run. No. 20 makes a notification of the start of work by the automatic run for the area surrounding the work area for the work by the straight ahead run (pillow ground area used as a turn route). Nos. 25 and 26 make a notification of the completion of the learning work which is automatically performed during the automatic run. No. 27 makes a notification of the remaining work amount to be performed by the automatic run. No. 28 notifies that the work is about to be restarted from a position different from the position in which the work by the automatic run was previously interrupted.

No. 29 in FIG. 26B is a sound/voice notification about switching of the automatic run mode. In detail, it makes a notification of the operation required for the switching to the unmanned automatic run mode.

Nos. 30 and 31 in FIG. 26B are sound/voice notifications about the run direction. No. 30 prompts the start of the rearward run, and No. 31 notifies the person around the work vehicle 1 that rearward run is about to start.

Nos. 32 and 33 in FIG. 26B are sound/voice notifications for notifying the start of transfer to a given position. No. 32 makes a notification of the start of transfer by the automatic run to the work start position. No. 33 makes a notification that after the end of the work by the automatic run, the transfer to the position for ending the run is started.

Nos. 34 to 42 in FIG. 26B are sound/voice notifications about the failsafe in the work vehicle 1. Nos. 34 to 36 are sound/voice notifications about the obstacle on the automatic run route. No. 34 makes a notification of the detecting of the obstacle. No. 35 makes a notification that the vehicle speed of the work vehicle 1 is limited in response to the detecting of the obstacle. No. 36 is a sound/voice notification that checks the restart of the automatic run having been stopped by the detecting of the obstacle. Nos. 37 to 40 are sound/voice notifications about the device for communicating with the work vehicle 1. No. 37, when the communication connection of the emergency stop remote controller (the remote operation device 3) is not complete, prompts for making the communication connection. No. 38 makes a notification that the communication environment of the tablet (the mobile communication terminal 2) is poor and what to do about it. Nos. 39 and 40 make an alert about the power supply for the devices 2 and 3 that communicate with the work vehicle 1. No. 41 and 42 are sound/voice notifications about the farm field state. No. 41 and 42 may be alerts performed based on information obtained at the time of the farm field registration, for example, or alerts of hazardous places detected during the automatic run.

Nos. 43 and 44 in FIG. 26B are sound/voice notifications about the remote operation. No. 43 notifies that a temporary stop instruction has been received from the remote controller (the remote operation device 3). No. 44 notifies that an emergency stop instruction has been received from the remote controller (the remote operation device 3).

Nos. 45 to 51 in FIG. 26B are sound/voice notifications about the work guidance in the work vehicle 1. Nos. 45 and 46 notify that it is timing to supply the stocked material required for driving the work vehicle 1. No. 47 notifies that it is timing to regenerate the DPF (diesel particulate filter) provided in a diesel engine. Nos. 48 and 49 are sound/voice notifications about the work machine. No. 48 is a sound/voice notification to prevent forgetting to lower the work machine at the start of the work by the automatic run. No. 49 prompts a faster lowering speed of the work machine. No. 50 is a sound/voice notification outputted when the engine is running at a low speed and is overloaded. No. 51 is a sound/voice notification for notifying, for working in a farm field different from the previous farm field, that there is a change in management content.

FIG. 27 is a table exemplifying the sound/voice notification applied when the work vehicle 1 provided in the work support system 100 is the combine harvester 1C.

No. 1 in FIG. 27 is a sound/voice notification about the registration of the farm field for the work by the automatic run. In detail, the operation of the mowing clutch is prompted, for the run to make a measurement for the farm field registration, so that the mowing work using the mowing unit 1C7 is not forgotten.

No. 2 in FIG. 27 is a sound/voice notification similar to No. 32 in FIG. 26B above, notifying the start of the transfer to the mowing start position.

Nos. 3 to 6 in FIG. 27 are sound/voice notifications about the work for discharging the threshed grain in the grain tank 1C4 to the outside of the combine harvester 1C. No. 3, when the mowing work is underway, gives an advance notification of the time to transfer to the discharge position. No. 4 makes a notification of the completion of the discharge work. No. 5 notifies that the fullness of the grain storage unit in a carrier that carries the grain (rice hull) is approaching. No. 6 prompts the adjustment of the position of the discharge port of the discharge auger 106. An instruction of the above adjustment is given, for example, so as to perform discharging by avoiding the grains in heaps where the grains discharged to the carrier are unevenly distributed.

No. 7 in FIG. 27 is a sound/voice notification about switching to the automatic run mode. In detail, a sound/voice notification about the manned automatic run mode (auto mode) prompts the user to switch to the manned automatic run mode at the time of determining the unmowed area.

Nos. 8 to 12 in FIG. 27 are sound/voice notifications about the failsafe in the combine harvester 1C. No. 8 notifies that the vehicle speed is being limited. The above sound/voice notification, for example, makes a notification that the vehicle speed is being limited when the combine harvester 1C is proceeding rearward or when rice fall over is detected (in the fall over detection mode). No. 9 prompts the mowing unit 1C7 to up. The above sound/voice notification is made so as to avoid a possible collision between the mowing unit 1C7 and asphalt, etc., when the combine harvester 1C starts running in a state of the mowing unit 1C7 down. No. 10 is a sound/voice notification for securing safety in the combine harvester 1C having a cabin specification. No. 11 prompts the proper positioning of the discharge auger 106 for securing safety. No. 12 notifies that the engine is under high load, and notifies a response thereto which is specific to the combine harvester 1C.

Nos. 13 to 22 in FIG. 27 are sound/voice notifications about the work guidance in the combine harvester 1C. Nos. 13 and 14 makes a notification of the place of a possible clogging. No. 15 makes a notification when grains that should have been harvested have not been harvested. Nos. 16 to 18 are sound/voice notifications that makes a notification of the state about the work setting. No. 16 makes a notification of the mowing height. Nos. 17 and 18 makes a notification of the state of the handling port. No. 19 is a sound/voice notification about the capacity of the grain tank 1C4. In detail, it makes a notification of how much grain is tanked in the tank. No. 20 makes a notification of the result of mowing, and checks whether or not the work may be continued. It is involved with mode notifications such as long and short dimensions. No. 21 makes a notification of the harvest amount in each farm field. No. 22 is a sound/voice notification that makes an alert at the time of working in a farm field where a breed variety different from that of the previous work farm field is to be planted.

FIG. 28 is a table exemplifying the sound/voice notification applied when the work vehicle 1 provided in the work support system 100 is the tractor 1T.

No. 1 and 2 in FIG. 28 are sound/voice notifications about the PTO provided in the tractor 1T. In detail, Nos. 1 and 2 are sound/voice notifications about the PTO switch on/off.

No. 3 in FIG. 28 is a sound/voice notification about the failsafe in the tractor 1T. No. 3 is, in detail, a sound/voice notification for securing safety in the tractor 1T having a cabin specification.

Nos. 4 and 5 in FIG. 28 are sound/voice notifications about the work guidance in the tractor 1T. No. 4 is a sound/voice notification about the PTO speed change position, in detail, notifying content of an improper state and prompting the user to check the state. Whether or not the PTO speed change position is correct can be determined by the PTO rotation speed. No. 5 is a sound/voice notification notifying that there is a difference between the content set at the mobile communication terminal 2 and the setting of the work vehicle 1. The run drive setting includes, for example, a setting for a four-wheel drive method and a setting for a two-wheel drive method.

FIG. 29 is a table exemplifying the sound/voice notification applied when the work vehicle 1 provided in the work support system 100 is the rice planter 1R.

No. 1 in FIG. 29 is a sound/voice notification similar to those in No. 32 in FIG. 26B and No. 2 in FIG. 27 above, performing a notification of the start transferring to the planting start position.

Nos. 2 to 4 in FIG. 29 are sound/voice notifications about the guidance of stocked material supply that the rice planter 1R performs in the middle of the work. The stocked material supply can be, for example, seedling supply, chemical supply, fertilizer supply, or fuel supply. No. 2 makes a notification that a route for supply has been displayed on the display unit 23 of the mobile communication terminal 2, for example, and that a supply run using the above route has started. No. 3 makes a notification of the start of the run toward the supply point. No. 4 notifies of the arrival at the supply point.

No. 5 in FIG. 29 is a sound/voice notification about a transmission. No. 5, in detail, makes an alert about the speed change pedal for starting the automatic run.

Nos. 6 to 11 in FIG. 29 are sound/voice notifications about the work guidance in the rice planter 1R. No. 6 prompts the vehicle body to run at a speed proper for seedling-planting by the planting unit 1R2. No. 7 and No. 8 are sound/voice notifications to prompt the stocked material supply, No. 7 prompts seedling supply, and No. 8 prompts fertilizer supply. No. 9 prompts a leveling rotor, which is as a leveling device to level the farm field face, to be in a position proper for the work. No. 10 and 11 are sound/voice notifications of an error in the work, No. 10 makes a notification of a fertilizer clogging, and No. 11 makes a notification of the fact that the seedling feed is not normally performed.

3. Notes, Etc.

Various technical features disclosed in the present specification can be changed in various ways without departing from the spirit of the technical creation thereof. Further, the multiple embodiments and modified examples shown in the present specification may be combined with each other within an allowable range.

4. Appendices

An exemplary work support method of the exemplary present invention is a work support method that supports work that uses a work vehicle, the method may be so configured as to include: switching a run mode to an automatic run mode in which the work vehicle is caused to automatically run in a farm field; switching, when a given condition is met in the automatic run mode, the run mode to a manual run mode in which the work vehicle is caused to manually run; and performing a switch notification to notify that the run mode is switched from the automatic run mode to the manual run mode, wherein the method may be so configured that a mode of the switch notification differs depending on the work vehicle's state at the time of the switching to the manual run mode (first configuration).

In the first configuration, it may be so configured that a difference in the mode of the switch notification may include at least any one of a difference in a device used for the notification and differentiating, using the same device, a way of notification (second configuration).

In the first or second configuration, it may be so configured that the mode of the switch notification differs between a case in which the work vehicle continues to run at the time of the switching to the manual run mode and a case in which the work vehicle stops running at the time of the switching to the manual run mode (third configuration).

In the third configuration, it may be so configured that when the work vehicle continues to run at the time of the switching to the manual run mode, the switch notification is performed using a sound/voice (fourth configuration).

In the third or fourth configuration, it may be so configured that the case in which the work vehicle continues to run at the time of switching to the manual run mode includes a case in which the given condition is met by an operator, who boards the work vehicle, performing a steering operation (fifth configuration).

In any of the third to fifth configurations, it may be so configured that in the case in which the work vehicle stops running at the time of switching to the manual run mode, the switch notification is performed using a display (sixth configuration).

In any of the third to sixth configurations, it may be so configured that the case in which the work vehicle stops running at the time of switching to the manual run mode may include at least one of a case in which the given condition is met due to an occurrence of a failure of a positioning communication unit provided in the work vehicle, and a case in which the given condition is met due to an obstacle sensed by an obstacle sensor (13) provided in the work vehicle (seventh configuration).

In the fifth configuration, it may be so configured that after the given condition is met by the steering operation and the switch notification is performed, a vehicle speed limit notification to notify that the vehicle speed of the work vehicle is limited is performed (eighth configuration).

In any of the first to eighth configurations, it may be so configured that in the case of switching to the manual run mode at the time of the work vehicle running rearward in the automatic run mode, a forward run notification to notify that the work vehicle runs forward is performed, after the performing of the switch notification (ninth configuration).

In the ninth configuration, it may be so configured that a vehicle speed limit notification to notify that a vehicle speed of the work vehicle is limited is performed, after the performing of the forward run notification (tenth configuration).

In any of the first to the tenth configurations, it may be so configured that an automatic run mode shift notification to notify a shift from the manual run mode to the automatic run mode is performed (eleventh configuration).

In the eleventh configuration, it may be so configured that a proceeding direction notification to notify a direction in which the work vehicle proceeds is performed, after the performing of the automatic run mode shift notification (twelfth configuration).

In any of the first to twelfth configurations, it may be so configured that when part of timings of the notification of multiple types of sounds causes an overlap thereby to cause a necessity to output, during outputting of a sound of a first notification of a former timing, a sound of a second notification at a next timing, the sound of the first notification is ended in the middle and the sound of the second notification is output after the ending with a break time period (thirteenth configuration).

Further, a work support method of the exemplary invention is a work support method that supports work that uses a work vehicle, the method may be so configured as to include: switching a run mode from a manual run mode in which the work vehicle is caused to manually run in a farm field to an automatic run mode in which the work vehicle is caused to automatically run; and notifying, when a stop condition for stopping the automatic run mode is met, a given operation required for the switching to the manual run mode (fourteenth configuration).

In the fourteenth configuration, it may be so configured that the given operation includes an operation for moving a speed change operation unit (LV) of the work vehicle to a neutral position or a minimum position (fifteenth configuration).

In the fourteenth or fifteenth configuration, it may be so configured that the given operation includes an operation of a first on/off switch (141) which is turned on and off at the time of the switching between the manual run mode and the automatic run mode (sixteenth configuration).

In any of the fourteenth to sixteenth configurations, it may be so configured that the given operation includes an operation of a second on/off switch (142) that is turned on and off at the time of switching between an action and a non-action of a work machine (1C7) of the work vehicle (seventeenth configuration).

In any of the fourteenth to seventeenth configurations, it may be so configured that the given operation includes an operation to put the work machine (1C7) of the work vehicle in the non-action state (eighteenth configuration).

In any of the fourteenth to eighteenth configurations, it may be so configured that the given operation includes multiple types of operations, and the multiple types of operations are notified in order according to a priority (nineteenth configuration).

In the nineteenth configuration, it may be so configured that among the multiple types of operations, the earlier the order in which an operator performed an action which requires the operation, the higher the priority (twentieth configuration).

In any of the fourteenth to twentieth configurations, it may be so configured that a stop notification to notify the stopping of the work vehicle by the automatic run is performed, and a notification of the given operation is performed after the stop notification (twenty-first configuration).

In any of the fourteenth to twenty-first configurations, it may be so configured that the notification of the given operation is performed by at least one of a sound/voice and a display (twenty-second configuration).

Further, an exemplary work support method of the exemplary present invention is a work support method that supports work that uses a work vehicle so provided as to be able to automatically run in a farm field, the method may be so configured as to include: performing a notification about the work vehicle; and setting a mode of the notification according to a setting by a user or according to a state of the work vehicle (twenty-third configuration).

In the twenty-third configuration, it may be so configured that the mode of the notification includes at least any of presence or absence of a sound/voice notification, a volume of the sound/voice notification, the number of repetitions of the sound/voice notification, repetition time of the sound/voice notification, an intonation of the sound/voice notification, a speed of the sound/voice notification, a sound/voice pitch of the sound/voice notification, a gender of a voice of the sound/voice notification, and a selection of an output source in the case of multiple sound output sources (twenty-fourth configuration).

In the twenty-third or twenty-fourth configuration, it may be so configured that a setting by a user includes a setting of whether or not to perform the sound/voice notification at the timing of a change in an action state of the work vehicle (twenty-fifth configuration).

In any of the twenty-third to twenty-fifth configurations, it may be so configured that the mode of the notification is changed depending on whether or not the work vehicle is running (twenty-sixth configuration).

In any of the twenty-third to twenty-sixth configurations, it may be so configured that the mode of the notification is changed in accordance with at least any one of a driving state of an engine of the work vehicle or an action state of a work machine (1C7) (twenty-seventh configuration).

In any of the twenty-third to twenty-seventh configurations, it may be so configured that the mode of the notification is changed in accordance with at least one of an environment surrounding the work vehicle and an action which the work vehicle is scheduled to perform (twenty-eighth configuration).

In any of the twenty-third to twenty-eighth configurations, it may be so configured that the mode of the notification is changed in accordance with a vehicle speed of the work vehicle (twenty-nineth configuration).

In any of the twenty-third to twenty-nineth configurations, it may be so configured that the mode of the notification is changed depending on whether a manned automatic run with an operator boarding the work vehicle or an unmanned automatic run without the operator (thirtieth configuration).

In any of the twenty-third to thirtieth configurations, it may be so configured that the mode of the notification includes at least one of the number of repetitions of the sound/voice notification and the repetition time of the sound/voice notification, and the mode of the notification is changed according to the number of repetitions of or the repetition time of the sound/voice notification from a start of the sound/voice notification (thirty-first configuration).

In any of the twenty-third to thirty-first configurations, it may be so configured that the mode of the notification is changed in accordance with at least one of the number of devices communicable with the work vehicle and a distance from the work vehicle to the devices (thirty-second configuration).

REFERENCE SIGNS LIST

1 work vehicle
1C combine harvester (work vehicle)
1C2 engine
1C7 mowing unit (work machine)
1R rice planter (work vehicle)
1R2 planting unit (work machine)
1R5 engine
1T tractor (work vehicle)
1T2 cultivating machine (work machine)
1T5 engine
1C5*b*, 1R6*b*, 1T6*b* steering wheel
2 mobile communication terminal (communicable terminal)
3 remote operation device (communicable terminal)
20 control unit
11 positioning communication unit
13 sensor (including obstacle sensor)
17, 25 notification unit
100 work support system
141 robot mode switch (first on/off switch)
142 PTO switch (second on/off switch)
F farm field
LV main speed change lever (speed change operation unit)

The invention claimed is:

1. A work support method for supporting work that uses a work vehicle, the work support method comprising:
switching a run mode to an automatic run mode;
controlling the work vehicle to automatically run in a farm field in response to switching to the automatic run mode;
switching, based on a given condition being met during the automatic run mode, the run mode to a manual run mode in which the work vehicle is caused to manually run; and
performing, based the switching of the run mode from the automatic run mode to the manual run mode, a switch notification to indicate that the run mode is switched to the manual run mode,
wherein a mode of the switch notification is:
a first mode when a state of the work vehicle is a first state, but not when the state is a second state, and
a second mode when the state is the second state, but not when the state is the first state, wherein the first mode comprises using a sound or a voice, the second mode comprises using a display, the first state comprises the work vehicle continuing to run at a time of the switching to the manual run mode, and the second state comprises the work vehicle stopping running at the time of the switching to the manual run mode.

2. The work support method according to claim 1, wherein the mode of the switch notification is further based on a device used for the switch notification, and further comprising determining one or more ways of notification based on the device.

3. The work support method according to claim 1, wherein, when the work vehicle continues to run at the time of the switching to the manual run mode, the given condition is met by an operator, who is aboard the work vehicle, performing a steering operation.

4. The work support method according to claim 3, further comprising performing, after the given condition is met by the steering operation and the switch notification is performed, a vehicle speed limit notification to notify that a vehicle speed of the work vehicle is limited.

5. The work support method according to claim 1, wherein, when the work vehicle stops running at the time of the switching to the manual run mode, the given condition is met due to:
an occurrence of a failure of a positioning communication unit provided in the work vehicle; or
an obstacle sensed by an obstacle sensor provided in the work vehicle.

6. The work support method according to claim 1, further comprising, after performing the switch notification, performing, based on the switching to the manual run mode when the work vehicle is running rearward in the automatic run mode, a forward run notification indicating that the work vehicle runs forward in the manual run mode.

7. The work support method according to claim 6, further comprising performing, after the performing of the forward run notification, a vehicle speed limit notification to notify that a vehicle speed of the work vehicle is limited.

8. The work support method according to claim 1, further comprising performing an automatic run mode shift notification to notify a shift from the manual run mode to the automatic run mode.

9. The work support method according to claim 8, further comprising performing, after the performing of the automatic run mode shift notification, a proceeding direction notification to notify a direction in which the work vehicle is configured to proceed.

10. The work support method according to claim 1, wherein, when the switch notification includes multiple sounds, performing the switch notification includes:
outputting of a sound of a first notification, the sound of the first notification is included in the multiple sounds;
stopping the sound of the first notification; and
outputting, after a break time period following the stopping of the sound of the first notification, a sound of a second notification.

* * * * *